US010230176B2

(12) United States Patent
Natsume

(10) Patent No.: US 10,230,176 B2
(45) Date of Patent: Mar. 12, 2019

(54) RADAR APPARATUS

(71) Applicant: DENSO CORPORATION, Kariya, Aichi-pref. (JP)

(72) Inventor: Kazuma Natsume, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 533 days.

(21) Appl. No.: 14/889,827

(22) PCT Filed: May 8, 2014

(86) PCT No.: PCT/JP2014/062379
§ 371 (c)(1),
(2) Date: Nov. 6, 2015

(87) PCT Pub. No.: WO2014/181835
PCT Pub. Date: Nov. 13, 2014

(65) Prior Publication Data
US 2016/0104946 A1 Apr. 14, 2016

(30) Foreign Application Priority Data
May 8, 2013 (JP) ................................ 2013-098803

(51) Int. Cl.
*G01S 7/35* (2006.01)
*H01Q 25/00* (2006.01)
(Continued)

(52) U.S. Cl.
CPC .............. *H01Q 25/00* (2013.01); *G01S 7/03* (2013.01); *G01S 7/35* (2013.01); *G01S 13/345* (2013.01);
(Continued)

(58) Field of Classification Search
CPC ................................. G01S 7/03; H01Q 25/00
(Continued)

(56) References Cited

U.S. PATENT DOCUMENTS 4,336,540 A * 6/1982 Goodwin .............. G01S 13/422 342/157
5,815,112 A * 9/1998 Sasaki ..................... G01S 13/87 342/113
(Continued)

FOREIGN PATENT DOCUMENTS

JP H11-287857 A 10/1999
JP 2000-155171 A 6/2000
(Continued)

OTHER PUBLICATIONS

International Preliminary Report on Patentability; International Application No. PCT/JP2014/062379; Filed: May 8, 2014 (with English Translation).
(Continued)

*Primary Examiner* — Marcus E Windrich
(74) *Attorney, Agent, or Firm* — Knobbe, Martens, Olson & Bear, LLP

(57) ABSTRACT

A radar apparatus includes a first antenna and a second antenna. The first antenna includes a plurality of first antenna elements that are arrayed in a first direction on a surface oriented to a forward direction, as antenna elements configuring the first antenna. The second antenna includes a plurality of second antenna elements that are arrayed in a second direction perpendicular to the first direction on the surface oriented to a forward direction, as antenna elements configuring the second antenna. The radar apparatus emits radar waves in a forward direction using either of the first and second antennas, and receives reflected waves of the radar waves using the other of the first and second antennas.

7 Claims, 13 Drawing Sheets

(51) Int. Cl.

| | |
|---|---|
| ***H01Q 1/32*** | (2006.01) |
| ***H01Q 21/06*** | (2006.01) |
| ***G01S 7/03*** | (2006.01) |
| ***G01S 13/34*** | (2006.01) |
| ***G01S 13/42*** | (2006.01) |
| ***G01S 13/58*** | (2006.01) |
| ***G01S 13/93*** | (2006.01) |

(52) U.S. Cl.
CPC ............ *G01S 13/42* (2013.01); *G01S 13/584* (2013.01); *G01S 13/931* (2013.01); *H01Q 1/3233* (2013.01); *H01Q 1/3258* (2013.01); *H01Q 21/061* (2013.01)

(58) Field of Classification Search
USPC ...................................................... 342/70–72
See application file for complete search history.

(56) References Cited

U.S. PATENT DOCUMENTS 6,246,365 B1 * 6/2001 Tokoro .................... G01S 13/42 342/149
6,288,672 B1 9/2001 Asano et al.
6,292,129 B1 9/2001 Matsugatani et al.
6,424,298 B1 7/2002 Nishikawa et al.
7,362,259 B2 * 4/2008 Gottwald ............... H01Q 1/325 342/159
8,009,082 B2 * 8/2011 Shinoda .................. G01S 7/352 342/147
8,248,272 B2 * 8/2012 Arnold ..................... G08G 1/01 340/916
8,390,507 B2 * 3/2013 Wintermantel ......... G01S 7/032 342/70
8,471,775 B2 * 6/2013 Nakabayashi ....... H01Q 13/206 342/70
9,541,639 B2 * 1/2017 Searcy ...................... G01S 7/03
2009/0267822 A1 * 10/2009 Shinoda .................. G01S 7/352 342/70
2009/0303105 A1 12/2009 Ando
2011/0074620 A1 * 3/2011 Wintermantel ......... G01S 7/032 342/70
2011/0221625 A1 * 9/2011 Cornic .................. G01S 13/424 342/29
2011/0298653 A1 12/2011 Mizutani et al.
2012/0194377 A1 * 8/2012 Yukumatsu ........... G01S 13/931 342/70

FOREIGN PATENT DOCUMENTS

| | | | |
|---|---|---|---|
| JP | 2000-284047 | A | 10/2000 |
| JP | 2001-044752 | A | 2/2001 |
| JP | 2009-300101 | A | 12/2009 |
| JP | 2010-127641 | A | 6/2010 |
| JP | 2011-526370 | A | 10/2011 |
| JP | 2011-257150 | A | 12/2011 |
| JP | 2012-098107 | A | 5/2012 |
| JP | 2012-159348 | A | 8/2012 |
| WO | 2014/181835 | A1 | 11/2014 |

OTHER PUBLICATIONS

International Search Report (translated version); International Application No. PCT/JP2014/062379, filed May 8, 2014; 5 pages.

* cited by examiner

| α1 | α2 | α3 | α4 | α5 | α6 | α7 |
|---|---|---|---|---|---|---|
| - | P(R11) | P(R12) | P(R13) | P(R14) | P(R15) | P(R16) |
| - | P(R21) | P(R22) | P(R23) | P(R24) | P(R25) | P(R26) |
| P(R31) | P(R32) | P(R33) | P(R34) | P(R35) | P(R36) | - |
| P(R41) | P(R42) | P(R43) | P(R44) | P(R45) | P(R46) | - |

FIG.16

| | | | | | | | | | | | | |
|---|---|---|---|---|---|---|---|---|---|---|---|---|
| H1 | P(R11) | - | P(R12) | - | P(R13) | - | P(R14) | - | P(R15) | - | P(R16) | - |
| H2 | P(R31) | P(R21) | P(R32) | P(R22) | P(R33) | P(R23) | P(R34) | P(R24) | P(R35) | P(R25) | P(R36) | P(R26) |
| H3 | P(R51) | P(R41) | P(R52) | P(R42) | P(R53) | P(R43) | P(R54) | P(R44) | P(R55) | P(R45) | P(R56) | P(R46) |
| H4 | - | P(R61) | - | P(R62) | - | P(R63) | - | P(R64) | - | P(R65) | - | P(R66) |

RADAR APPARATUS

CROSS-REFERENCE TO RELATED APPLICATION

This application is a U.S. National Phase application under 35 U.S.C. 371 of International Application No. PCT/JP2014/062379 filed on May 8, 2014 and published in Japanese as WO 2014/181835 A1 on Nov. 13, 2014. This application is based on and claims the benefit of priority from Japanese Patent Application No. 2013-098803, filed May 8, 2013. The entire disclosures of all of the above applications are incorporated herein by reference.

TECHNICAL FIELD

The present invention relates to a radar apparatus.

BACKGROUND ART

A radar apparatus that includes an array antenna as a reception antenna for receiving reflected waves of radar waves is conventionally known. This radar apparatus uses the phase difference in reception signals that occurs among reception antenna elements configuring the array antenna to detect the incoming azimuth of the reflected waves. The radar apparatus then detects the azimuth of a target that has reflected the radar waves on the basis of the detected incoming azimuth.

In the radar apparatus, the number of targets that can be detected can be increased by increasing the number of reception antenna elements configuring the array antenna. However, when the number of reception antenna elements is increased, the size of the reception circuit increases. This also leads to increase of cost. For example, the number of analog-to-digital converters configuring the reception circuit may increase. Further, the number of switching units may increase. The switching units are used for switching the reception signals of the plurality of reception antenna elements and inputting the reception signals to a single analog-to-digital converter.

On the other hand, according to another known technique, in a transmission antenna that emits radar waves, a plurality of transmission antenna elements are arranged in the same direction as that of the array of the reception antenna elements to apparently increase the number of reception antenna elements (e.g., refer to PTL 1).

According to this technique, as a result of arraying the plurality of transmission antenna elements in the same direction as that of the array of the reception antenna elements, a path difference from the emission point to the reception point can be created for the radar waves emitted from the respective transmission antenna elements. As a result, reception signal combinations are increased in a manner similar to that when the reception antenna elements are increased. According to this technique, the number of reception antenna elements can be apparently increased by two-fold by increasing, from one to two, the number of transmission antenna elements configuring the transmission antenna.

CITATION LIST

Patent Literature

[PTL 1] JP-A-2000-155171

SUMMARY OF INVENTION

Technical Problem

As set forth above, a plurality of transmission antenna elements of some radar apparatuses of conventional art are arrayed in the same direction as that of the array of the reception antenna elements. A radar apparatus configured in this way is merely able to improve detection capability on a horizontal plane, for the incoming azimuth of reflected waves, the horizontal plane corresponding to the array direction of the reception antenna elements.

The present invention has been made in light of such issues. An object of the present invention is to provide a novel technique for improving detection capability of a radar apparatus for the incoming azimuth of reflected waves, while reducing the number of antenna elements.

Solution to Problem

A radar apparatus of the present invention includes a first antenna and a second antenna. The radar apparatus emits radar waves in a forward direction using either of a first antenna and a second antenna, and receives reflected waves of the radar waves using the other of the first antenna and the second antenna.

The first antenna includes a plurality of first antenna elements that are arrayed in a first direction on a surface oriented to a forward direction, as antenna elements configuring the first antenna. The second antenna includes a plurality of second antenna elements that are arrayed in a second direction perpendicular to the first direction on the surface oriented to a forward direction, as antenna elements configuring the second antenna.

According to the radar apparatus, the array direction of the first antenna elements and the array direction of the second antenna elements are perpendicular to each other. Therefore, antenna elements arrayed in the first or second direction in a reception antenna can apparently be increased in the second or first direction perpendicular thereto.

Therefore, according to the present invention, incoming azimuths (incoming azimuths in a three-dimensional space) relative to the first and second directions of the reflected waves can be detected without arraying the antenna elements in both the first and second directions in the reception antenna.

Therefore, according to the present invention, the number of antenna elements can be reduced, while the detection capability can be enhanced in the radar apparatus for the incoming azimuth of the reflected waves. Specifically, the first antenna can be configured to include a plurality of rows of first antenna element groups, in the second direction perpendicular to the first direction, each of the rows including the reception antenna elements arrayed in the first direction.

With this configuration, when the first antenna is used as the reception antenna, the number of rows of first antenna element groups serving as reception antenna element groups can apparently (virtually) be significantly increased in the second direction. Therefore, azimuth detection capability can be remarkably enhanced with a small number of antenna elements.

In a radar apparatus, the same functions can be obtained when the transmission antenna that emits the radar waves and the reception antenna that receives the reflected waves are interchanged. Therefore, the above effect is not limited to when the first antenna is used as the reception antenna, but can be achieved when the first antenna is used as the transmission antenna. To clarify, advantageous effects will be described by way of an example of using the first antenna as the reception antenna. It should be noted that similar effects can be achieved even when the first antenna is used as the transmission antenna.

In the radar apparatus of the present invention, the shape and arrangement interval of the first antenna elements can be adjusted taking account of the detection range of targets in the first and second directions. For example, in an environment in which targets should be detected over a wider range in the first direction than in the second direction, the first antenna elements can be arranged at a short interval in the first direction, and each first antenna element can be configured to be elongated in the second direction.

When the first antenna elements that are elongated in the second direction are used in this way, the first antenna can be configured such that the first antenna elements configuring the plurality of rows of first antenna element groups are alternately arranged in rows in the first direction.

When the first antenna element is elongated in the second direction, there may be a situation where the first antenna elements configuring each row of first antenna element groups cannot be arranged so as to be aligned straight in the second direction. That is, there may be a situation where the arrangement cannot be achieved because the first antenna elements that are adjacent in the second direction interfere (overlap) with each other.

On the other hand, when the first antenna elements are alternately (repeatedly) arranged in rows in the first direction, each row of first antenna element group can be arranged in the second direction at a desired arrangement interval, under the condition where the first antenna elements are elongated in the second direction.

For example, the rows of first antenna element groups can be arranged in the second direction at an arrangement interval that is shorter than the length of the first antenna element in the second direction. That is, the first antenna element can be configured such that adjacent first antenna element groups are arranged at positions differing from each other by a distance L that is shorter than the length of the first antenna element in the second direction.

The first antenna can be configured to include two rows of first antenna element groups as the plurality of rows of first antenna element groups. Specifically, the first antenna can be configured such that the first antenna elements configuring the two rows of first antenna element groups are alternately arrayed in rows in the first direction, thereby forming a zigzag array along two directions that are slanted relative to the first direction.

The second antenna can be configured such that adjacent second antenna elements are arranged at positions differing from each other by a distance corresponding to twice the distance L in the second direction. As described above, the distance L is the arrangement interval between the first antenna element groups in the first antenna. That is, the second antenna can be configured such that adjacent second antenna elements are arranged at an interval corresponding to twice the arrangement interval of the first antenna element groups.

In addition, the second antenna elements can be configured such that adjacent second antenna elements are arranged at positions differing from each other by the distance L in the second direction. That is, the second antenna can be configured such that a plurality of second antenna elements are arranged at an interval equal to the arrangement interval of the first antenna element groups.

According to the radar apparatus in which the second antenna elements are arrayed as described above, detection capability for the incoming azimuth of the reflected waves can be efficiently improved. Further, the above radar apparatus can be configured as follows when the first antenna is used as the reception antenna and the second antenna is used as the transmission antenna. That is, the radar apparatus can be configured such that the radar waves are time-divided and emitted from the second antenna elements. Specifically, the radar apparatus can be configured to include a transmission control means for inputting transmission signals of radar waves to the plurality of second antenna elements, so that the radar waves are emitted from the plurality of second antenna elements at differing timings.

The radar apparatus may also include an azimuth detecting means for detecting an incoming azimuth of the reflected waves on the basis of the reception signal of each combination of the first and second antenna elements, with the reception signals for each of the first antenna elements configuring the first antenna being sorted and defined for each second antenna element that is the transmission source of the corresponding radar wave.

As in the present invention, when the incoming azimuth of the reflected waves is detected based on the reception signal of each combination of the first and second antenna elements, the number of first antenna elements (reception antenna elements) can be virtually increased, and the incoming azimuth of the reflected waves can be detected with high accuracy.

BRIEF DESCRIPTION OF DRAWINGS

FIG. 16 is a table showing an arrangement of reception points in the radar apparatus related to the fourth embodiment;

DESCRIPTION OF EMBODIMENTS

With reference to the drawings, some embodiments of the present invention will be described.

First Embodiment

Figure 1:
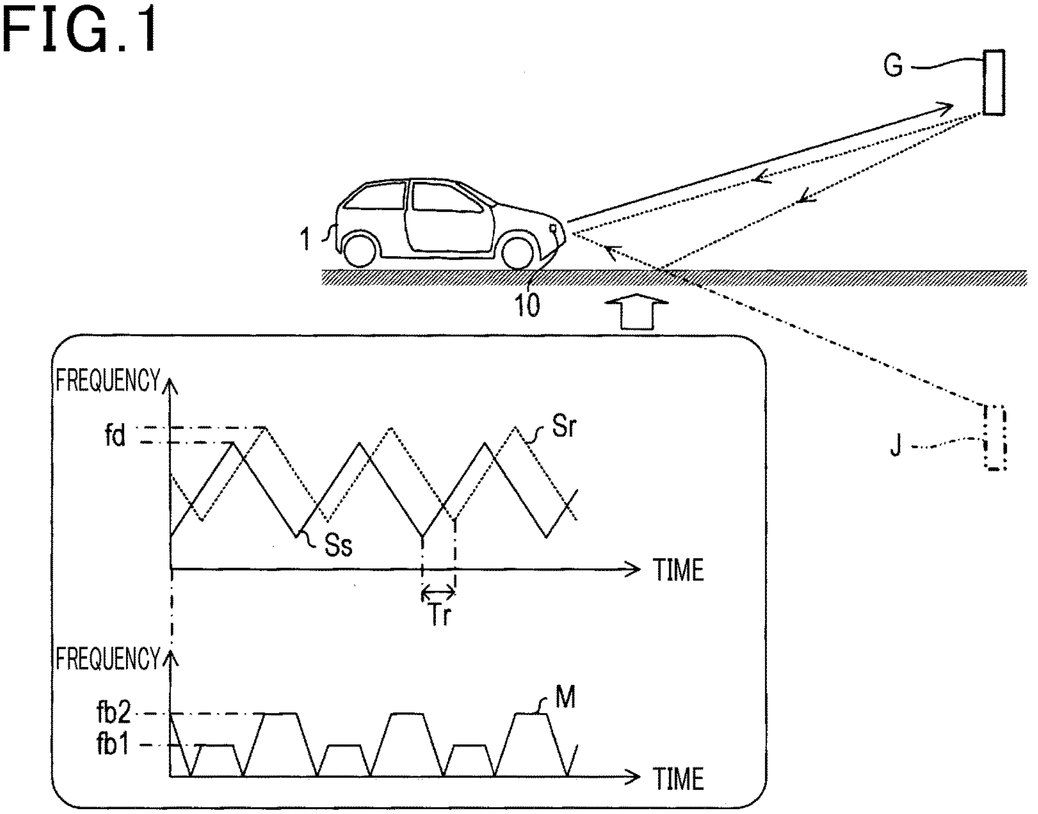
FIG. 1 is a diagram illustrating an emission mode for radar waves and a reception mode for the reflected waves in a radar apparatus of a first embodiment.

As shown in FIG. 1, a radar apparatus 10 of the present embodiment is an in-vehicle radar apparatus that is used being mounted to a vehicle 1. The radar apparatus 10 detects a distance D to a target, a speed V relative to the target, and an azimuth (Θx, Θy) of the target, and outputs target information including these detection values. The target includes a preceding vehicle, indicators, signboards, and the like. The target information outputted from the radar apparatus 10 is supplied, for example, to a drive assist apparatus (not shown) in the vehicle 1 via an in-vehicle network.

The radar apparatus 10 is configured as a FMCW (frequency modulated continuous wave) radar apparatus. In other words, the radar apparatus 10 emits frequency-modulated radar waves, and detects the distance D and the relative speed V related to each target on the basis of frequency difference between the radar waves and the reflected waves.

As indicated in the upper graph in the solid-line frame of FIG. 1, in the radar apparatus 10, a transmission signal Ss is inputted to a transmission antenna 21, and emitted as a radar wave. In this case, the transmission signal Ss has been frequency-modulated by a triangular-wave modulation signal and thus the frequency thereof gradually increases and decreases in a linear manner in relation to time. Then, the radar waves (reflected waves) reflected by a target are received by a reception antenna 23.

A reception signal Sr of the reception antenna 23 that includes a reflected wave component is characterized by a delay from the transmission signal Ss, the delay corresponding to time Tr based on the distance D to the target. The reception signal Sr is also characterized by a Doppler shift from the transmission signal Ss, the shift corresponding to a frequency fd based on the speed V relative to the target.

The radar apparatus 10 mixes the reception signal Sr, characterized as mentioned above, with the transmission signal Ss in a mixer 30 and generates a beat signal M. As indicated in the lower graph in the solid-line frame of FIG. 1, the beat signal M is a frequency component that is a difference between the two signals Sr and Ss. The radar apparatus 10 then calculates the Doppler shift frequency fd and a frequency fr that corresponds to the delay time Tr from a frequency fb1 and a frequency fb2 of the beat signal M. The frequency fb1 is obtained during an up-modulation period in which the frequency of the transmission signal Ss increases. The frequency fb2 is obtained during a down-modulation period in which the frequency of the transmission signal Ss decreases. The radar apparatus 10 detects the distance D and the relative speed V for the target, from the frequencies fr and fd.

Furthermore, the radar apparatus 10 detects the incoming azimuth of the reflected waves by performing a digital beam forming process (referred to, hereafter, as DBF process) on the reception signals. As a result, the radar apparatus 10 detects the azimuth (Θx, Θy) of each target.

In the present specification, XY coordinates are expressed with the X-axis being set in a horizontal direction over a surface of an antenna board 20 oriented to a forward direction of the vehicle 1, and the Y-axis being set in a vertical direction over the surface of the antenna board 20. An azimuth (corresponding to a so-called azimuth angle) on a plane passing through the X-axis and perpendicular to the surface of the antenna board 20 is expressed by Θx. An azimuth (corresponding to a so-called angle of elevation) on a plane passing through the Y-axis and perpendicular to the surface of the antenna board 20 is expressed by θy. The azimuth of a target in terms of the azimuth (θx,θy) is expressed by (Θx,Θy).

Figure 2:
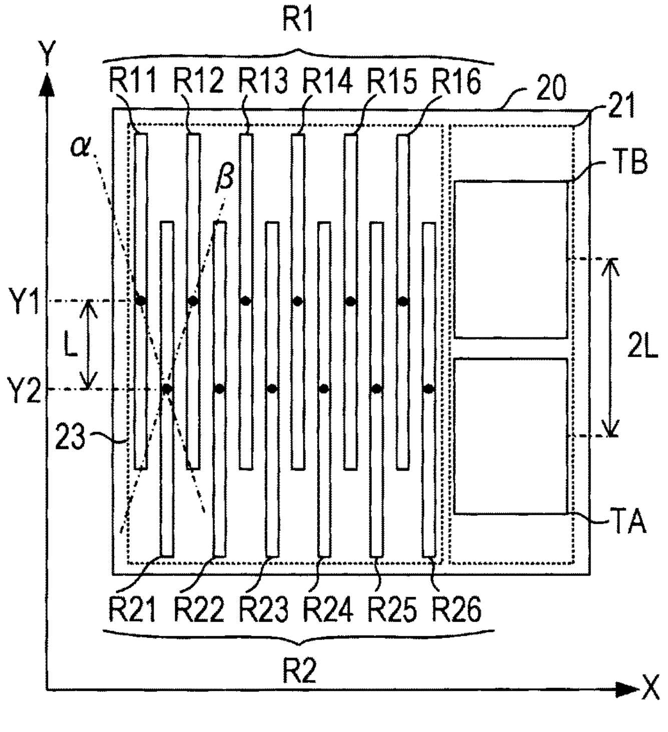
FIG. 2 is a diagram illustrating configurations of a transmission antenna and a reception antenna in the radar apparatus of the first embodiment.

With reference to FIG. 2, the configurations of the transmission antenna 21 and the reception antenna 23 will be described. The transmission antenna 21 and the reception antenna 23 provided to the radar apparatus 10 are configured as planar antennas. Specifically, the transmission antenna 21 and the reception antenna 23 are configured by a conductor pattern formed on the surface of the antenna board 20. The antenna board 20 is set so that the surface thereof is oriented to a forward direction of the vehicle 1 so that the radar waves are emitted ahead of the vehicle 1.

As shown in FIG. 2, the transmission antenna 21 that emits the radar waves is configured to include a plurality of transmission antenna elements TA and TB on the surface of the antenna board 20. The transmission antenna elements TA and TB are arrayed in the Y-axis direction perpendicular to the X-axis direction on the surface of the antenna board 20. The transmission signals Ss are time-divided and alternately inputted to the transmission antenna elements TA and TB. The radar waves are alternately emitted from the transmission antenna elements TA and TB.

On the other hand, the reception antenna 23 that receives the reflected waves is configured to include a plurality of reception antenna elements R11 to R16 and R21 to R26 on the surface of the antenna board 20. The reception antenna elements R11 to R16 are arrayed at even intervals in the X-axis direction at a first position Y1 in the Y-axis direction to configure a first reception antenna element group R1. The reception antenna elements R21 to R26 are arranged at even intervals in the X-axis direction at a second position Y2 in the Y-axis direction to configure a second reception antenna element group R2. In this way, the reception antenna 23 is configured to include a plurality of rows (specifically, two rows) of reception antenna element groups R1 and R2 in the Y-axis direction, each reception antenna element group R1 and R2 being arrayed in the X-axis direction.

The reception antenna elements R11 to R16 and R21 to R26 included in the reception antenna 23 are each configured to be elongated in the Y-axis direction. Each of the reception antenna elements R11 to R16 and R21 to R26 is shaped in this way because, while the in-vehicle radar apparatus 10 is required to detect targets over a wide angle range in the horizontal direction (X-axis direction), target detection over a limited angle range is sufficient for the vertical direction (Y-axis direction). Since indicators, signboards, and the like are set at positions about 5 meters from the road surface, target detection over a range of only about several degrees is sufficient for the vertical direction.

To detect a target over a wide angle range in the horizontal direction, the arrangement interval in the X-axis direction of the reception antenna elements R11 to R16 and R21 to R26 has to be short. On the other hand, to detect faraway targets, the area of the reception surface is has to be large. For these reasons, the reception antenna elements R11 to R16 and R21 to R26 are ensured to be elongated in the Y-axis direction.

In an arrangement method for reception antenna elements, the reception antenna elements R11 to R16 and R21 to R26 are aligned straight in the Y-axis direction. According to this method, the reception antenna elements R11 to R16 and R21 to R22 are needed to have a short length in the Y-axis direction such that the reception antenna elements adjacent in the Y axis direction does not overlap (do not interfere with) each other when the reception antenna element groups R1 and R2 are arranged in the Y-axis direction at an appropriate interval in conformity with the target detection range.

Therefore, in the present embodiment, the reception antenna elements R11 to R16 and R21 to R26 are arrayed in a zigzag manner in the X-axis direction. As shown in FIG. 2, the reception antenna 23 is configured such that the reception antenna elements R11 to R16 and R21 to R26 are arranged at an even interval so as to alternate in the order of rows. Specifically, the reception antenna 23 is configured such that the reception antenna elements R11 to R16 configuring the reception antenna element group R1 of a first row and the reception antenna elements R21 to R26 configuring the reception antenna element group R2 of a second row are alternated one by one in the order of rows.

With this configuration, the reception antenna 23 is configured such that the reception antenna elements R11 to R16 and R21 to R26 are arrayed in a zigzag manner along two directions (α-axis direction and β-axis direction indicated in FIG. 2) that are slanted relative to the X-axis direction.

With this zigzag array, the reception antenna elements R11 to R16 and R21 to R26 can be configured to be elongated in the Y-axis direction, regardless of an arrangement interval L in the Y-axis direction between the reception antenna element groups R1 and R2. In the present embodiment, the length of the reception antenna elements R11 to R16 and R21 to R26 in the Y-axis direction is set to a value greater than the arrangement interval L in the Y-axis direction between the reception antenna element groups R1 and R2.

Furthermore, in the present embodiment, the positional relationship of the transmission antenna elements TA and TB with the reception antenna element groups R1 and R2 is set as follows. That is, the arrangement interval in the Y-axis direction between the transmission antenna elements TA and TB is set to 2L which is twice the arrangement interval L in the Y-axis direction between the reception antenna element groups R1 and R2. In this way, the reception antenna element groups R1 and R2 are arranged at positions different from each other by the distance L in the Y-axis direction, while the transmission antenna elements TA and TB are arranged at positions different from each other by the distance 2L in the Y-axis direction.

In the present embodiment, the transmission antenna elements TA and TB and the reception antenna element groups R1 and R2 are arranged in the Y-axis direction in a positional relationship as described above. Thus, the radar apparatus 10 is configured such that the reception signals obtained from the reception antenna element groups R1 and R2 are equivalent to those which are obtained from four rows of reception antenna element groups R1 and R2 arranged at an even interval in the Y-axis direction.

In the present embodiment, the radar waves are emitted from the transmission antenna elements TA and TB. In this environment, as shown in FIG. 3, the path lengths from an emission point P(TA) of the radar waves from the transmission antenna element TA to reception points P(R1) and P(R2) of the reception antenna element groups R1 and R2, respectively, are longer than the path lengths from an emission point P(TB) of the radar waves from the transmission antenna element TB to the reception points P(R1) and P(R2) of the reception antenna element groups R1 and R2, respectively, by a distance $2\Delta=2L\times\sin(\theta y)$, which corresponds to the interval 2L between the transmission antenna elements TA and TB.

Figure 3:
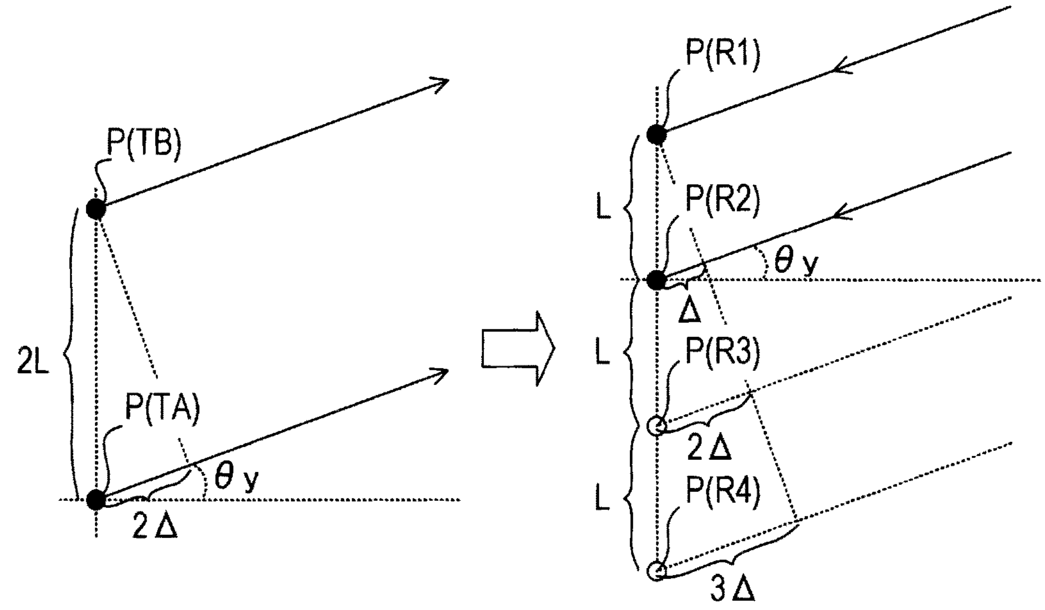
FIG. 3 is an explanatory diagram relating to path difference in the radar apparatus of the first embodiment.

In FIG. 3, the propagation paths of radar waves from the emission points P(TA) and P(TB) to the reception points P(R1) and P(R2) are indicated by solid lines. The propagation paths are premised on that the reflection points of the radar waves are sufficiently far away and the reflected waves are propagated from an azimuth θy that is equal to the emission azimuth of the radar waves.

The left-hand area of FIG. 3 explains a path difference 2Δ that occurs due to the difference between the emission points P(TA) and P(TB) of the radar waves. On the other hand, the right-hand area of FIG. 3 explains a path difference 4 that occurs due to the difference between the reception points P(R1) and P(R2).

The reception point P(R1) is of the reception antenna element group R1, while the reception point P(R2) is of the reception antenna element group R2. In FIG. 3, the black circles indicate the emission points P(TA) and P(TB) of the transmission antenna elements TA and TB and the reception points P(R1) and P(R2) of the reception antenna element groups R1 and R2, on a vertical plane where the normal line corresponds to the X-axis direction.

As can be seen from FIG. 3, when the path length from the emission point P(TB) to the reception point P(R1) is used as a reference path length, a difference between the path length from the emission point P(TB) to the reception point P(R2) and the reference path length, is expressed as a distance $\Delta=L\times\sin(\theta y)$ that is a path difference corresponding to the interval L between the reception antenna element groups R1 and R2.

On the other hand, the path difference between the path length from the emission point P(TA) to the reception point P(R1) and the reference path length is 2Δ, because the path difference 2Δ is caused between the emission points P(TA) and P(TB) (see the left-hand area of FIG. 3).

As shown in FIG. 3, assuming that a third reception antenna element group having a reception point P(R3) is present, the path difference 2Δ corresponds to a difference between a path length from the emission point P(TB) to the reception point P(R3) and the reference path length.

The path difference between the path length from the emission point P(TA) to the reception point P(R2) and the reference path length is 3Δ, because the path difference 2Δ is caused between the emission points P(TA) and P(TB)

Assuming that a fourth reception antenna element group having a reception point P(R4) is present, the path difference 3Δ corresponds to a difference between a path length from the emission point P(TB) to the reception point P(R4) and the reference path length. In the right-hand area of FIG. 3, the virtual reception points P(R3) and P(R4) are indicated by white circles.

Figure 4:
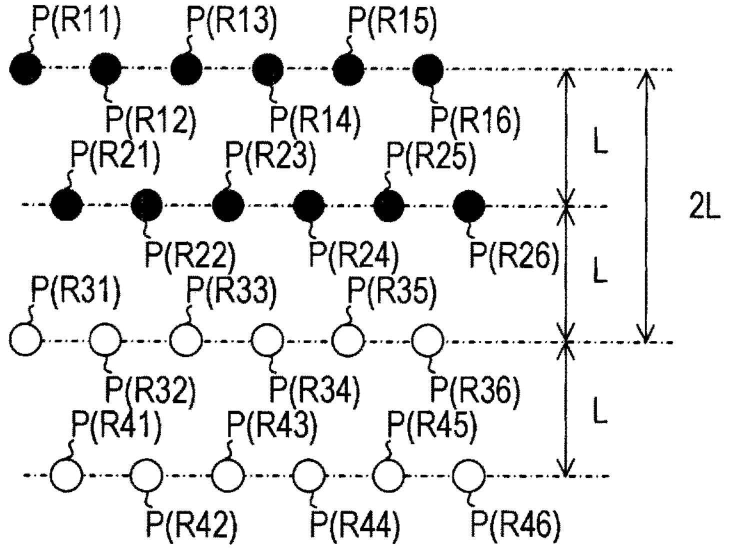
FIG. 4 is a diagram illustrating a geometrical arrangement of reception points in the radar apparatus of the first embodiment.

Furthermore, in FIG. 4, the black circles indicate reception points P(R11) to P(R16) and P(R21) to P(R26) of the respective reception antenna elements R11 to R16 and R21 to R26 on the surface of the antenna board 20. The reception points P(R11) to P(R16) and P(R21) to P(R26) correspond to respective antenna centers (center points) of the reception antenna elements R11 to R16 and R21 to R26. The reception antenna elements R11 to R16 and R21 to R26 have respective feeding points which are set up at the antenna centers (center points).

In FIG. 4, reception points P(R31) to P(R36) and P(R41) to P(R46) plotted by white circles are corrected reception points (virtual reception points). The corrected reception points are obtained by correcting the reception points P(R11) to P(R16) and P(R21) to P(R26) of the reception antenna elements R11 to R16 and R21 to R26 that receive the reflected waves of the radar waves emitted from the transmission antenna element TA, assuming that the radar waves have been emitted from the reception antenna element TB.

In other words, the corrected reception points are obtained by correcting the reception points P(R11) to P(R16) and P(R21) to P(R26) in the Y-axis direction. In this case, the correction is made such that the path lengths from the emission point (TB) to the reception points P(R31) to P(R36) and P(R41) to P(R46) are equal to the path lengths from the emission point (TA) to the reception points P(R11) to P(R16) and P(R21) to P(R26) when the above assumptions are not made.

In this way, when the transmission antenna elements TA and TB and the reception antenna element groups R1 and R2 are arrayed in the Y-axis direction according to the positional relationship of FIG. 2, reception signals that can be obtained are almost equivalent, as shown in FIGS. 3 and 4, to those obtained when the reception antenna element groups R1 and R2 are arrayed in four rows at an even interval L in the Y-axis direction.

In the present embodiment, the radar waves are alternately emitted in a time-division manner from the transmission antenna elements TA and TB to highly accurately detect the incoming azimuth of the reflected waves on the basis of the principle described above. The reception signals (specifically, beat signals M) of the reception antenna elements R11 to R16 and R21 to R26 are sorted, on an element basis, for the transmission antenna elements TA and TB, thereby generating reception signals (beat signals M), on a combination basis, for the respective combinations of the reception antenna elements R11 to R16 and R21 to R26 and the transmission antenna elements TA and TB. Using these signals, the incoming azimuth of each reflected wave, that is, the azimuth of each target (Θx,Θy) is detected.

According to this azimuth detection method, increase in the number of reception antenna elements R11 to R16 and R21 to R26 configuring the reception antenna 23 can be minimized. Thus, the incoming azimuth of the reflected waves can be detected with high accuracy.

For example, let us assume the case where the reception antenna 23 has the same configuration as that in the present embodiment, but the transmission antenna 21 is configured as a single antenna instead of a plurality of transmission antenna elements. In this case, since the reception antenna 23 has only two reception antenna element groups R1 and R2, detection of the azimuths of two or more targets is essentially disabled in the Y axis direction.

On the other hand, in an environment where the road surface readily reflects the radar waves, as indicated by the broken lines in FIG. 1, there are created a first propagation path along which the reflected wave from a target (signboard G) directly reaches the reception antenna 23 and a second propagation path along which the reflected wave from the target (signboard G) is reflected by the road surface and then reaches the reception antenna 23. The presence of the second propagation path causes a false image J of the target (signboard G) to be generated at the point indicated by the double-dot chain line in FIG. 1.

In other words, an environment where the road surface readily reflects the radar waves causes a phenomenon in which two or more targets are apparently present when only a single target is actually present. Therefore, a radar apparatus in which the transmission antenna 21 is configured as a single antenna cannot appropriately detect the azimuth of a target in such an environment.

In this regard, according to the present embodiment, the number of reception antenna element groups can be virtually increased to four. Therefore, the effects of the false image J as mentioned above can be minimized to thereby detect the azimuth of a target in the Y-axis direction with high accuracy.

Figure 5:
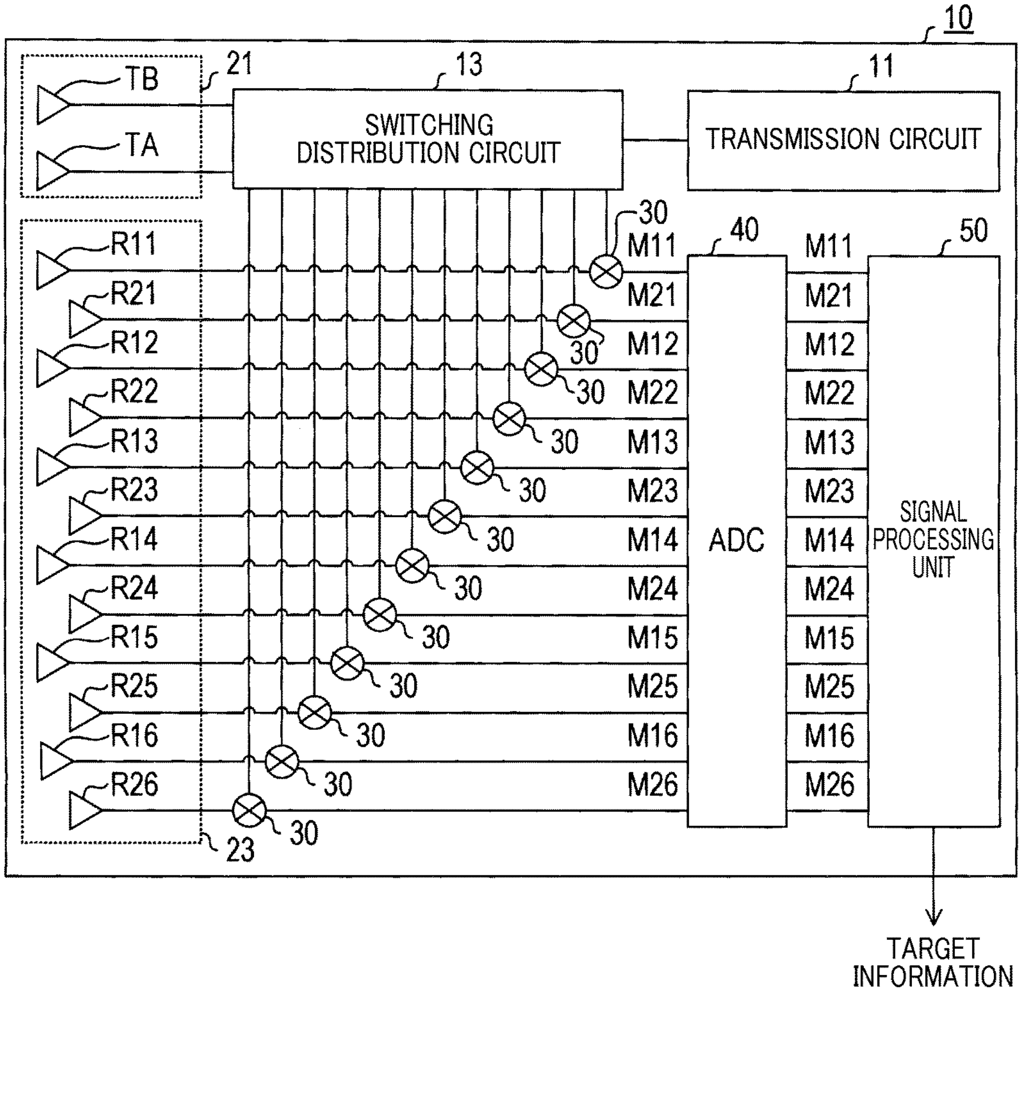
FIG. 5 is a block diagram illustrating an internal configuration of the radar apparatus of the first embodiment.

With reference to FIG. 5, a detailed configuration of the radar apparatus 10 will be described. As shown in FIG. 5, the radar apparatus 10 of the present embodiment includes a transmission circuit 11, a switching distribution circuit 13, the transmission antenna 21, the reception antenna 23, mixers 30 for the respective reception antenna elements R11 to R16 and R21 to R26, an analog-to-digital converter 40, and a signal processing unit 50.

The transmission circuit 11 inputs the original signal of the transmission signal Ss to the switching distribution circuit 13. The switching distribution circuit 13 performs power distribution of the original signal of the transmission signal Ss inputted from the transmission circuit 11 to the transmission signal Ss and a local signal. The switching distribution circuit 13 then alternately inputs the transmission signal Ss to the transmission antenna elements TA and TB, at a predetermined cycle. On the other hand, the local signal is inputted to the mixers 30. The transmission antenna elements TA and TB alternately emit radar waves ahead of the vehicle 1 on the basis of the transmission signal Ss inputted from the switching distribution circuit 13.

The reception signal Sr of each of the reception antenna elements R11 to R16 and R21 to R26 that receive the reflected waves is inputted to a corresponding one of the mixers 30. The respective mixers 30 of the reception antenna elements R11 to R16 and R21 to R26 each mix the reception signal Sr and the local signal inputted from the switching distribution circuit 13 to generate the beat signal M. Hereafter, for the reception antenna elements R11 to R16 and R21 to R26, the beat signals M, each of which are a mixed signal of the reception signal Sr of a reception antenna element and the local signal, are expressed as beat signals M11 to M16 and M21 to M26, respectively.

The beat signals M11 to M16 and M21 to M26 generated by the respective mixers 30 of the reception antenna elements R11 to R16 and R21 to R26 are inputted to the analog-to-digital converter 40. The analog-to-digital converter 40 has conversion circuits (not shown), the number of which corresponds to the number of beat signals M11 to M16 and M21 to M26. The analog-to-digital converter 40 converts each of the inputted beat signals M11 to M16 and M21 to M26 to a digital signal (data).

The beat signals M11 to M16 and M21 to M26 that have been AD converted by the analog-to-digital converter 40 are inputted to the signal processing unit 50. The signal processing unit 50 analyzes the beat signals M11 to M16 and M21 to M26, thereby detecting the distance D, the relative speed V, and the azimuth (Θx,Θy) for each target and outputs the target information for each target.

Figure 6:
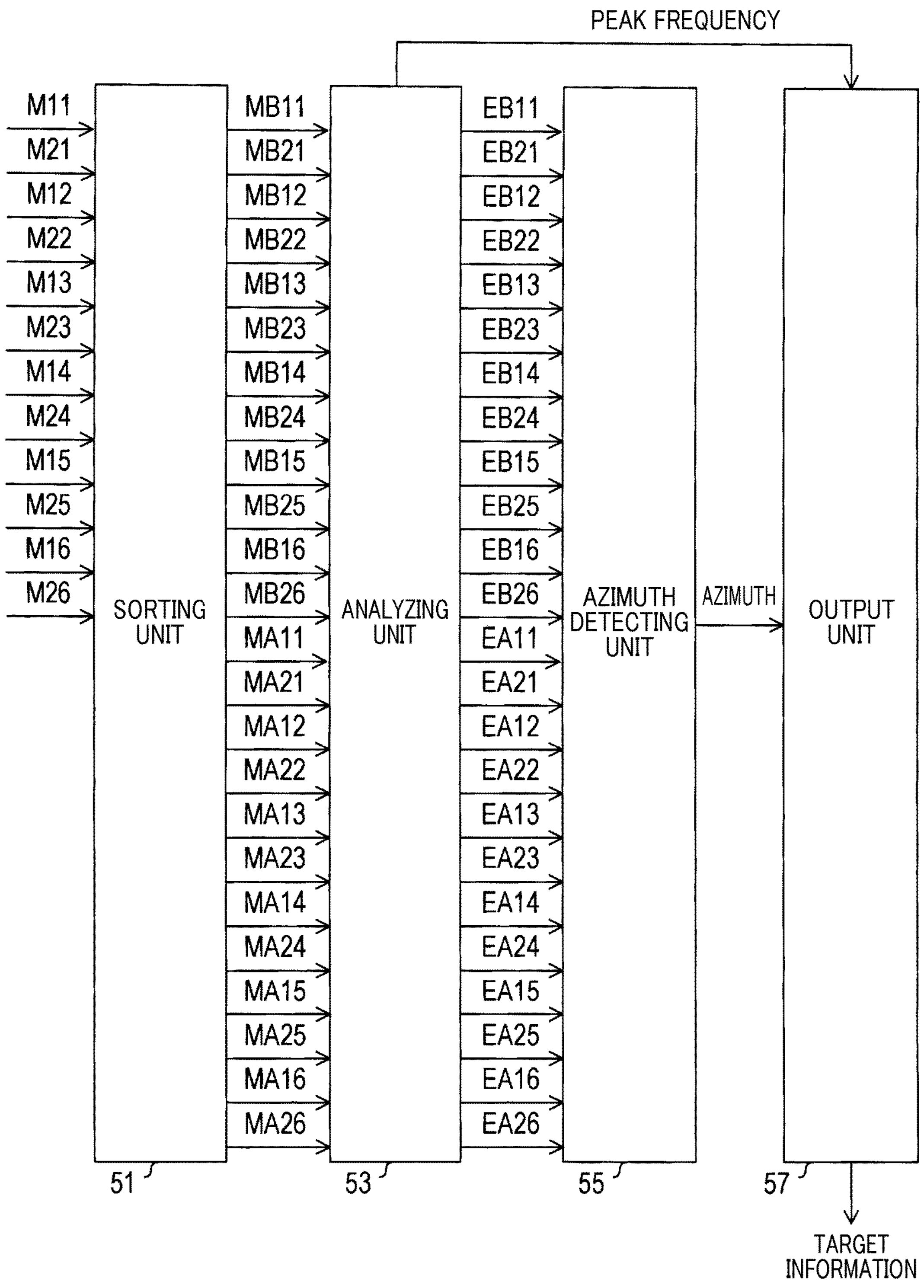
FIG. 6 is a block diagram illustrating an internal configuration of the signal processing unit illustrated in FIG. 5.

Specifically, the signal processing unit 50 includes, as shown in FIG. 6, a sorting unit 51, an analyzing unit 53, an azimuth detecting unit 55, and an output unit 57. The sorting unit 51 separates the beat signals M11 to M16 and M21 to M26 into beat signals for the transmission antenna elements TA and TB. The sorting unit 51 then inputs separated beat signals MA11 to MA16 and MA21 to MA26, and MB11 to MB16 and MB21 to MB26 to the analyzing unit 53.

The beat signal MA11 is generated by separating and extracting a signal from the beat signal M11, the signal being of a period including the reflected wave component of the radar wave emitted from the transmission antenna element TA. The beat signal MB11 is generated by separating and extracting a signal from the beat signal M11, signal being of a period including the reflected wave component of the radar wave emitted from the transmission antenna element TB.

In a similar manner, the beat signals MA12 to MA16 and MA21 to MA26 are generated by separating and extracting signals from the beat signals M12 to M16 and M21 to M26, respectively, the signals being of respective periods including the reflected wave components of the radar wave emitted from the transmission antenna element TA. The beat signals MB12 to MB16 and MB21 to MB26 are generated by separating and extracting signals from the beat signals M12 to M16 and M21 to M26, respectively, the signals being of respective periods including the reflected wave components of the radar waves emitted from the transmission antenna element TB.

During the period over which the transmission antenna element TA (or the transmission antenna element TB) is emitting radar waves, the reflected waves thereof are received by the reception antenna 23. In this environment, the sorting unit 51 can, for example, generate the beat signals MA11 to MA16 and MA21 to MA26, and MB11 to MB16 and MB21 to MB26 in the following manner.

That is, the sorting unit 51 can separate each of the beat signals M11 to M16 and M21 to M26 into a beat signal of the period over which the radar waves are transmitted from the transmission antenna element TA and a beat signal of the period over which the radar waves are transmitted from the transmission antenna element TB. As a result, the sorting unit 51 can generate the beat signals MA11 to MA16 and MA21 to MA26, and MB11 to MB16 and MB21 to MB26.

The analyzing unit 53 performs frequency analysis of the beat signals MA11 to MA16 and MA21 to MA26, and MB11 to MB16 and MB21 to MB26 inputted from the sorting unit 51, for each combination of the reception antenna elements R11 to R16 and R21 to R26 and the transmission antenna elements TA and TB.

Specifically, the analyzing unit 53 detects the frequencies fb1 and fb2 of each reflected wave component included in the beat signals MA11 to MA16 and MA21 to MA26, and MB11 to MB16 and MB21 to MB26 through frequency analysis. As described above, the frequency fb1 is the peak frequency during an up-modulation period in the beat signal MA11 to MA16 and MA21 to MA26, and MB11 to MB16 and MB21 to MB26. The frequency fb2 is a peak frequency during the down-modulation period in the beat signal MA11 to MA16 and MA21 to MA26, and MB11 to MB16 and MB21 to MB26.

The analyzing unit 53 can detect the frequency fb1 of the reflected wave component for each of the beat signals MA11 to MA16 and MA21 to MA26, and MB11 to MB16 and MB21 to MB26, by detecting a frequency at which reception power indicates a peak of not less than a threshold, from a frequency spectrum of the beat signal during the up-modulation period. The analyzing unit 53 can detect the frequency fb2 of the reflected wave component by detecting a frequency, at which reception power indicates a peak of not less than a threshold, from a frequency spectrum of the beat signal during the down-modulation period.

The analyzing unit 53 extracts reflected wave components as signals EA11 to EA16 and EA21 to EA26, and EB11 to EB16 and EB21 to EB26 from the beat signals MA11 to MA16 and MA21 to MA26, and MB11 to MB16 and MB21 to MB26, on the basis of the information of the detected peak frequencies fb1 and fb2, and inputs the extracted signals into to the azimuth detecting unit 55.

The extracted signals EA11 to EA16 and EA21 to EA26, and EB11 to EB16 and EB21 to EB26 are signals obtained by extracting the peak frequency fb1 and fb2 components, which are the reflected wave components, from the beat signals MA11 to MA16 and MA21 to MA26, and MB11 to MB16 and MB21 to MB26, respectively. The extracted signals EA11 to EA16 and EA21 to EA26, and EB11 to EB16 and EB21 to EB26 are generated for each peak frequency fb1 in the up-modulation period and each peak frequency fb2 in the down-modulation period.

The azimuth detecting unit 55 performs an azimuth detection process using the extracted signals EA11 to EA16 and EA21 to EA26, and EB11 to EB16 and EB21 to EB26, for each reflected wave component (for each of peak frequency fb1 and fb2). The azimuth detecting unit 55 thereby detects the incoming azimuth of each reflected wave, or in other words, the azimuth (Θx,Θy) of each target. Specifically, the azimuth detecting unit 55 detects the azimuth (Θx,Θy) of each reflected wave component by performing the azimuth detection process shown in FIG. 7 for each reflected wave component, using the extracted signal EA11 to EA16 and EA21 to EA26, and EB11 to EB16 and EB21 to EB26 corresponding to the reflected wave component.

Figure 7:
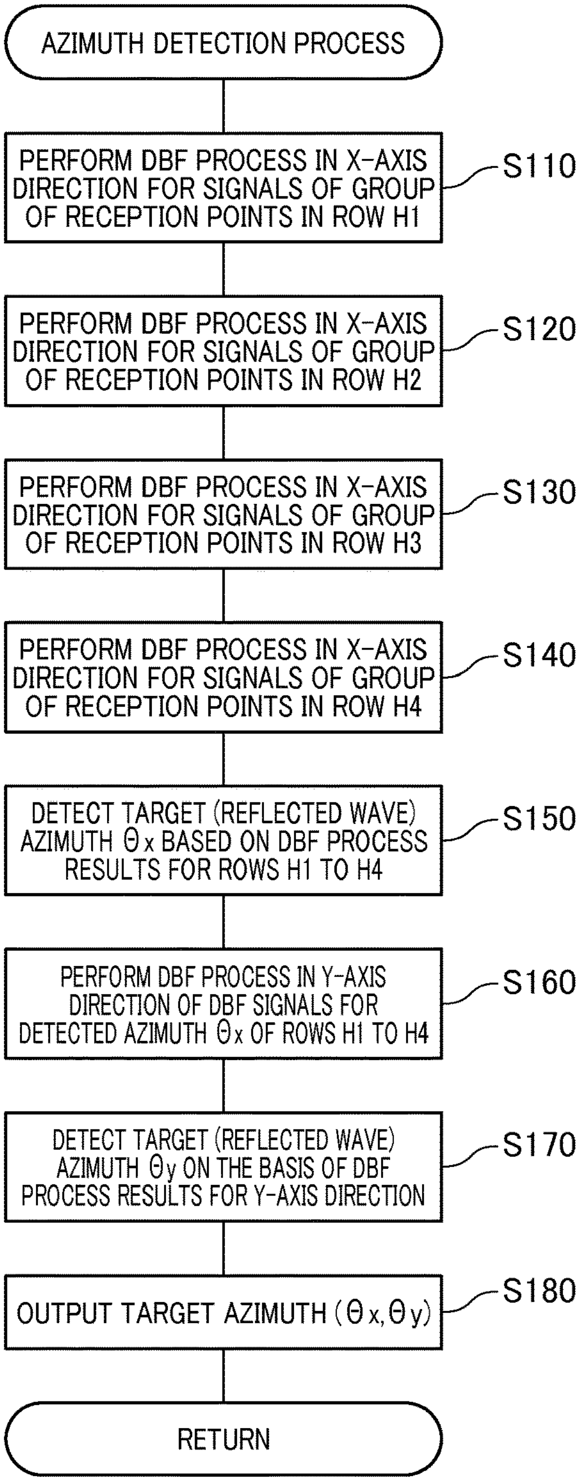
FIG. 7 is a flowchart illustrating an azimuth detection process of the radar apparatus related to the first embodiment.

Once the azimuth detection process shown in FIG. 7 is started, the azimuth detecting unit 55 performs the DBF process using the extracted signals EB11 to EB16 for each combination of reception antenna elements R11 to R16, configuring the first reception antenna element group R1, and the transmission antenna element TB (Step S110). Specifically, the azimuth detecting unit 55 performs the DBF process in the X-axis direction, which is the array direction of the corresponding reception points P(R11) to P(R16).

That is, regarding the azimuth θx in the X-axis direction, the azimuth detecting unit 55 generates a synthesized signal for each azimuth θx to be processed. In the synthesized signal, the extracted signals EB11 to EB16 are synthesized so as to emphasize the incoming wave component from the azimuth θx to be processed. As is well known, emphasis can be achieved by weighting the extracted signal EB11 to EB16 and performing DBF synthesis, so that directivity is imparted to the azimuth θx to be processed. The azimuth detecting unit 55 determines the reception power of the incoming wave from the azimuth θx to be processed based on the synthesized signal.

At the DBF process at step S110, the azimuth detecting unit 55 generates the synthesized signal of the extracted signals EB11 to EB16, for each azimuth θx to be processed, in the manner described above. The azimuth detecting unit 55 thereby detects an azimuth spectrum related to the azimuth θx. In this way, the azimuth detecting unit 55 calculates the azimuth spectrum of an incoming wave for a group of reception points P(R11) to P(R16) in a row H1 shown in FIG. 8. The detected azimuth spectrum indicates the correspondence between the azimuth θx and the reception power from the azimuth θx.

Further, the azimuth detecting unit 55 uses the extracted signals EB21 to EB26 for each combination of the reception antenna elements R21 to R26, configuring the second reception antenna element group R2, and the transmission antenna element TB to perform the DBF process in the X-axis direction, which is the array direction of the corresponding reception signals P(R21) to P(R26) (S120).

In other words, at step S120, the azimuth detecting unit 55 generates a synthesized signal of the extracted signals EB21 to EB26, for each azimuth θx to be processed, by a method similar to the one used at step S110. The azimuth detecting unit 55 thereby detects the azimuth spectrum related to the azimuth θx.

Figure 8:
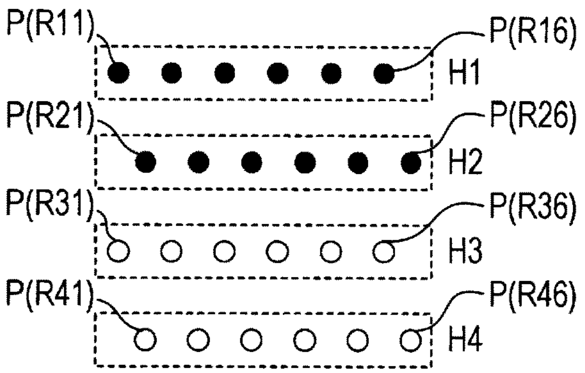
FIG. 8 is a diagram illustrating groups of reception points subjected to a DBF (digital beam-forming) process in the radar apparatus related to the first embodiment.

At step S120, the azimuth detecting unit 55 detects the azimuth spectrum of an incoming wave for a group of reception points P(R21) to P(R26) in a row H2 shown in FIG. 8, in the manner described above. However, in the DBF process of step S120, the range of the azimuth θx to be processed can be restricted to a range over which a target is present, based on the processing result at step S110.

In other words, the azimuth Θx of the target can be approximately estimated according to the processing result obtained at step S110. At step S120, the azimuth detecting unit 55 can perform beamforming (generate the synthesized signal for the corresponding azimuth θx), with the range of the azimuth θx to be processed restricted to the periphery of the azimuth Θx of the target estimated from the processing result obtained at step S110. As a result, processing load of the azimuth detecting unit 55 associated with the DBF process can be reduced.

It should be noted that the reception points P(R21) to P(R26) of the extracted signals EB21 to EB26 used in the DBF process at step S120 are shifted in the X-axis direction relative to the reception points P(R11) to P(R16) of the extracted signals EB11 to EB16 used at step S110. Therefore, the DBF process performed at step S120 can include a correction for the amount of shifting.

Furthermore, the azimuth detecting unit 55 uses the extracted signals EA11 to EA16 for each combination of reception antenna elements R11 to R16, configuring the first reception antenna element group R1, and the transmission antenna element TA to perform the DBF process in the X-axis direction, which is the array direction of the corresponding reception signals P(R31) to P(R36) (S130).

In other words, the azimuth detecting unit 55 generates a synthesized signal of the extracted signals EA11 to EA16, for each azimuth θx to be processed, by a method similar to the one used at step S110. The azimuth detecting unit 55 thereby detects the azimuth spectrum related to the azimuth θx. At step S130, the azimuth detecting unit 55 detects the azimuth spectrum of an incoming wave for a group of reception points P(R31) to P(R36) in a row H3 shown in FIG. 8, in the manner described above. In the DBF process at step S130, the range of the azimuth θx to be processed can be restricted in a manner similar to the process performed at step S120.

Furthermore, the azimuth detecting unit 55 uses the extracted signals EA21 to EA26 for each combination of reception antenna elements R21 to R26, configuring the second reception antenna element group R2, and the transmission antenna element TA to perform the DBF process in the X-axis direction, which is the array direction of the corresponding reception signals P(R41) to P(R46) (S140).

In other words, the azimuth detecting unit 55 generates a synthesized signal of the extracted signals EA21 to EA26, for each azimuth θx to be processed, by a method similar to the one used at step S110. The azimuth detecting unit 55 thereby detects the azimuth spectrum related to the azimuth θx.

At step S140, the azimuth detecting unit 55 detects the azimuth spectrum of an incoming wave for a group of reception points P(R41) to P(R46) in a row H4 shown in FIG. 8, in the manner described above. In the DBF process performed at step S140, the range of the azimuth θx to be processed can be restricted in a manner similar to the processes performed at steps S120 and S130. Further, at step S140, the DBF process including a correction corresponding to the amount of shifting can be performed in a manner similar to the process performed at step S120.

After completing the processes performed at steps S110 to S140, the azimuth detecting unit 55 detects each azimuth θx as the incoming azimuth of the reflected wave, or in other words, the azimuth Θx of the target (step S150). In this case, each azimuth θx indicates a peak having a reception power of not less than the threshold in the azimuth spectrum detected through the processes.

Herein, the azimuth detecting unit 55 can detect the azimuth Θx of each target on the basis of overlapping of the azimuth spectrums detected at steps S110 to S140. As another example, at step S150, the azimuth detecting unit 55 can detect, for each azimuth spectrum, the azimuth indicating a peak having a reception power of not less than the threshold in the azimuth spectrum. The azimuth detecting unit 55 can then detect the azimuth Θx of each target by performing a statistical process (e.g. by averaging) for the detected azimuths in the plurality of azimuth spectrums.

As another example, the azimuth detecting unit 55 can use one of the azimuth spectrums detected at steps S110 to S150 to detect the azimuth Θx of each target from the azimuth spectrum. The azimuth detecting unit 55 can also detect an azimuth spectrum from the synthesized signals generated at steps S110 to S140 to detect the azimuth Θx of each target on the basis of the detected azimuth spectrum.

After completing the process at step S150, control proceeds to step S160 where the azimuth detecting unit 55 performs the DBF process in the Y-axis direction for each of the detected azimuths Θx described above. The azimuth detecting unit 55 then detects the azimuth Θy of the corresponding target.

In the DBF process for each azimuth Θx performed at step S160, the azimuth detecting unit 55 obtains a DBF signal for the azimuth Θx, or a DBF signal of each of rows H1 to H4. The DBF signals of the rows H1 to H4 for the azimuths Θx herein correspond to the respective synthesized signals (i.e., the synthesized signals obtained by beamforming the azimuth Θx) in which the extracted signals are synthesized by the DBF processes at steps S110 to S140 so as to emphasize the incoming wave component from the azimuth Θx.

The azimuth detecting unit 55 uses the DBF signals of the rows H1 to H4 for the azimuth Θx and performs the DBF process in the Y-axis direction in which the corresponding reception points P(R1) to P(R4) are arrayed. In other words, for the azimuth θy in the Y-axis direction, the azimuth detecting unit 55 generates a synthesized signal (i.e., a synthesized signal obtained by beamforming the azimuth θy to be processed) for each azimuth θy to be processed. The synthesized signal is obtained by synthesizing the DBF signals of the rows H1 to H4 so that the incoming wave component from the azimuth θy to be processed is emphasized. The azimuth detecting unit 55 then determines the reception power of the incoming wave from the azimuth θy to be processed, based on the synthesized signal.

In the DBF process at step S160, the azimuth detecting unit 55 generates a synthesized signal for each azimuth θy to be processed, in respect of the DBF signals of the rows H1 to H4 for the azimuth Θx, in the manner described above. The azimuth detecting unit 55 thereby detects the azimuth spectrum related to the azimuth θy. The detected azimuth spectrum indicates the correspondence between the azimuth θy and the reception power from the azimuth θy.

In this way, the azimuth spectrum related to the azimuth θy for each azimuth Θx is detected. After that, control proceeds to step S170 where the azimuth detecting unit 55 detects each azimuth θy as the azimuth Θy of each target (incoming azimuth of the reflected wave). In this case, each azimuth θy indicates a peak having a reception power of not less than the threshold in the azimuth spectrum detected at step S160.

The azimuth detecting unit 55 inputs the azimuth (Θx,Θy) detected in this way to the output unit 57, the azimuth being of each target that has reflected the radar waves (step S180). Then, the azimuth detecting unit 55 terminates the azimuth detection process. The azimuth detecting unit 55 repeatedly performs the azimuth detection process specifically described above, for the peak frequencies fb1 and fb2. The azimuth detecting unit 55 thereby sequentially provides the output unit 57 with the azimuth (Θx,Θy) of each target that is positioned ahead.

The output unit 57 detects the distance D to a target and the speed V relative to the target, the target being positioned in each azimuth (Θx,Θy). The output unit 57 performs the detection on the basis of the peak frequencies fb1 and fb2 obtained from the analyzing unit 53 and the azimuths (Θx,Θy) for the peak frequencies fb1 and fb2 obtained from the azimuth detecting unit 55. The output unit 57 then outputs, for each target, the target information including information on the distance D, relative speed V, and azimuth (Θx,Θy) of the target.

The radar apparatus 10 of the present embodiment is configured as described above. According to the present embodiment, the radar apparatus 10 is configured to include the reception antenna 23 in which the reception antenna elements R11 to R16 and R21 to R26 are in a zigzag array. In the radar apparatus 10 configured in this way, the azimuth detection capability for targets (reflected waves) in the vertical direction is enhanced by providing two transmission antenna elements TA and TB in the Y-axis (vertical) direction.

Therefore, according to the present embodiment, the effects of the false image J can be minimized and highly accurate target detection can be achieved without providing new reception antenna elements in the vertical direction in the reception antenna 23.

Second Embodiment

Hereinafter, a radar apparatus 10 of a second embodiment will be described. The radar apparatus 10 of the second embodiment differs from that of the first embodiment only in the azimuth detection process performed by the azimuth detecting unit 55. Therefore, hereafter, the azimuth detection process performed by the azimuth detecting unit 55 will be selectively described.

Figure 9:
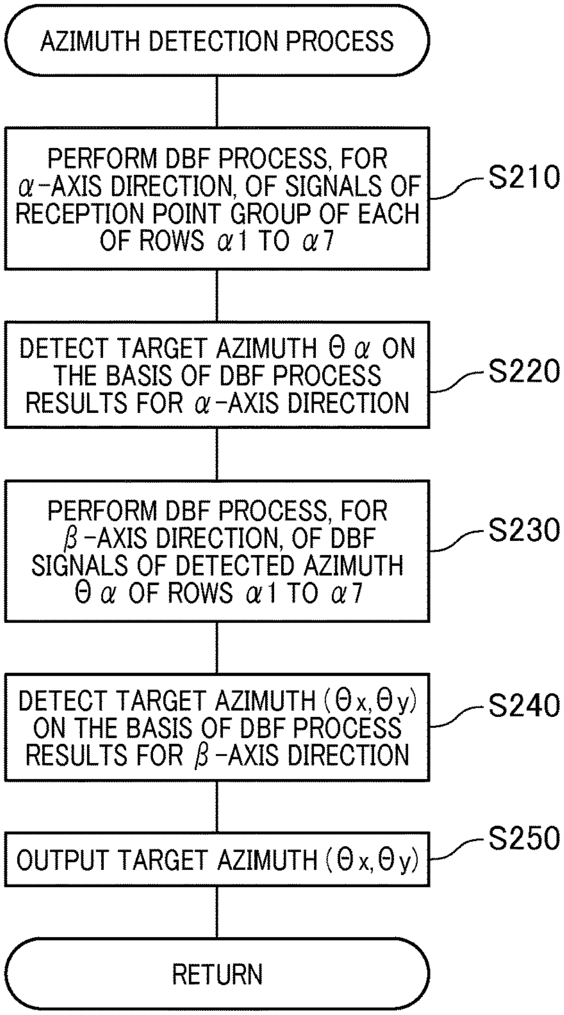
FIG. 9 is a flowchart illustrating an azimuth detection process of a radar apparatus related to a second embodiment.

The azimuth detecting unit 55 of the present embodiment repeatedly performs the azimuth detection process shown in FIG. 9, instead of the azimuth detection process shown in FIG. 7. Once the azimuth detection process is started, the azimuth detecting unit 55 performs the DBF process in the a-axis direction using the extracted signals corresponding to the group of reception points of the row (step S210). The DBF process is performed, on a row basis, for a plurality of rows (row α1 to row α7) of reception points P(R11) to P(R16), P(R21) to P(R26), P(R31) to P(R36), and P(R41) to P(R46) arrayed in an a-axis direction shown in the upper portion of FIG. 10.

Figure 10:
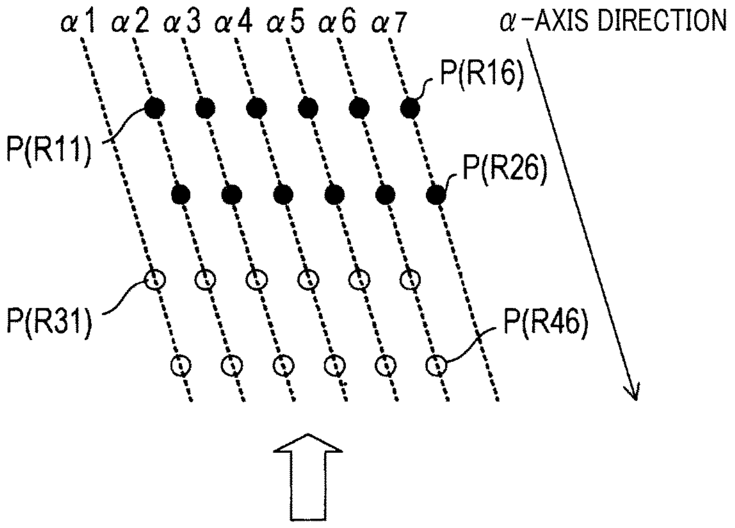
FIG. 10 is a diagram illustrating groups of reception points subjected to a DBF process in the radar apparatus related to the second embodiment.

As described in the first embodiment, corrected reception points P(R11) to P(R16), P(R21) to P(R26), P(R31) to P(R36), and P(R41) to P(R46) are arrayed as shown in the upper portion of FIG. 10. The corrected reception points P(R11) to P(R16), P(R21) to P(R26), P(R31) to P(R36), and P(R41) to P(R46) are obtained by correcting the reception points P(R11) to P(R16) and P(R21) to P(R26) of the reception antenna elements R11 to R16 and R21 to R26, i.e. reception points of the radar waves emitted from the transmission antenna elements TA and TB. The correction is made assuming that the radar waves have been emitted from the transmission antenna element TB.

The assumption described above is that the emission source of the radar waves is the transmission antenna element TB. Therefore, the corrected reception points P(R11) to P(R16) and P(R21) to P(R26) of the reception signals (extracted signals EB11 to EB16 and EB21 to EB26) corresponding to the radar waves emitted from the transmission antenna element TB remain unchanged after correction.

On the other hand, the corrected reception points P(R31) to P(R36) and P(R41) to P(R46) of the reception signals (extracted signals EA11 to EA16 and EA21 to EA26) corresponding to the radar waves emitted from the transmission antenna element TA are arranged at positions shifted from those of the reception points P(R11) to P(R16) and P(R21) to P(R26) before correction, in the Y-axis direction by a distance corresponding to the arrangement interval 2L between the transmission antenna elements TA and TB.

In the present embodiment, in a geometrical arrangement of the virtual reception points P(R11) to P(R16), P(R21) to P(R26), P(R31) to P(R36), and P(R41) to P(R46), a group of reception points arranged in a row along the a-axis direction of the zigzag array (see FIG. 2) is taken as a group of reception points of a single array antenna. The DBF process in the a-axis direction is performed based on the extracted signals corresponding to this group of reception points.

The respective groups of reception points of rows α1 to α7 shown in the upper portion of FIG. 10 are indicated in the columns in the lower portion of the FIG. 10. At step S210, the azimuth detecting unit 55 performs the DBF process using the extracted signals EA11 and EA21 corresponding to the group of reception points P(R31) and P(R41) in the row al as the DBF process for the row α1.

In other words, for an azimuth θα relative to the a-axis direction, the azimuth detecting unit 55 generates a synthesized signal for each azimuth θα to be processed. In the synthesized signal, the extracted signals EA11 and EA21 are synthesized so as to emphasize the incoming wave component from the azimuth θα to be processed. Based on the synthesized signal, the azimuth detecting unit 55 then obtains the reception power of the incoming wave from the azimuth θα to be processed, followed by detecting the azimuth spectrum for the azimuth θα. The azimuth θα is on a plane that extends from the a-axis in a direction perpendicular to the antenna board 20 and is expressed in terms of an angle from the a-axis.

As a DBF process for the row α2, the azimuth detecting unit 55 performs the DBF process using the extracted signals EB11, EB21, EA12, and EA22 corresponding to the group of reception points P(R11), P(R21), P(R32), and P(R42) in the row α2, followed by detecting the azimuth spectrum for the azimuth θα.

Similarly, as a DBF process for the row α3, the azimuth detecting unit 55 performs the DBF process using the extracted signals EB12, EB22, EA13, and EA23 corresponding to the group of reception points P(R12), P(R22), P(R33), and P(R43) in the row α3, followed by detecting the azimuth spectrum related to the azimuth θα.

Similarly, as a DBF process for the row α4, the azimuth detecting unit 55 performs the DBF process using the extracted signals EB13, EB23, EA14, and EA24 corresponding to the group of reception points P(R13), P(R23), P(R34), and P(R44) in the row α4, followed by detecting the azimuth spectrum related to the azimuth θα.

The azimuth detecting unit 55 also performs the DBF processes for the rows α5 to α7 in a similar manner, and detects the azimuth spectrums. The extracted signals corresponding to the reception points P(R14), P(R24), P(R35) and P(R45) in the row α5 correspond to extracted signals EB14, EB24, EA15, and EA25, respectively. The extracted signals corresponding to the reception points P(R15), P(R25), P(R36) and P(R46) in the row α6 correspond to extracted signals EB15, EB25, EA16, and EA26, respectively. Besides, the extracted signals corresponding to the reception points P(R16) and P(R26) in the row α7 correspond to extracted signals EB16 and EB26, respectively.

After completing step S210, the azimuth detecting unit 55 detects the azimuth Θα of a target (reflected wave) on the basis of the azimuth spectrums of the rows α1 to α7 detected in the above processes (step S220). At this step, a process similar to step S150 can be performed on the basis of the results of the DBF process (azimuth spectrums) for the rows α1 to α7.

Figure 11:
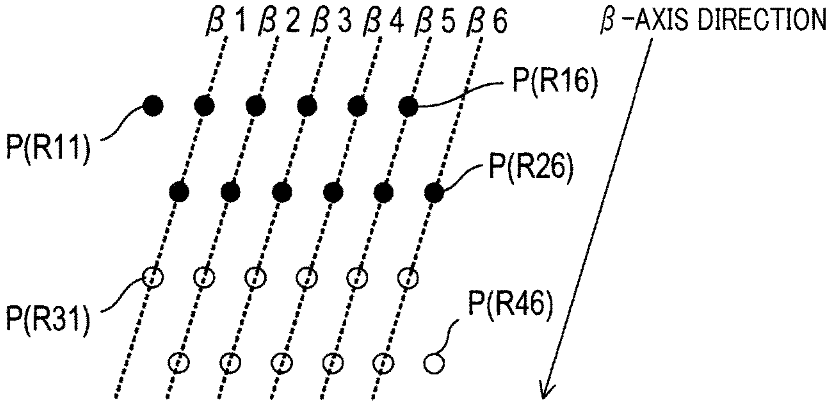
FIG. 11 is a diagram illustrating groups of reception points arrayed in an axial direction in the radar apparatus related to the second embodiment.

Subsequently, control proceeds to step S230 where the azimuth detecting unit 55 performs the DBF process for the β-axis direction shown in FIG. 11, for each of the detected azimuths Θα described above, followed by detecting the azimuth Θβ of the corresponding target.

At step S230, the azimuth detecting unit 55 can perform the following process as the DBF process in the β-axis direction for each azimuth Θα. That is, for the azimuth θβ relative to the β-axis direction, the azimuth detecting unit 55 generates a synthesized signal for each azimuth θβ to be processed. In the synthesized signal, the DBF signals of the rows α1 to α7 for the azimuth Θα are synthesized so as to emphasize the incoming wave component from the azimuth θβ to be processed. Based on the synthesized signal, the azimuth detecting unit 55 obtains the reception power of the incoming wave from the azimuth θβ to be processed, followed by detecting the azimuth spectrum related to the azimuth θβ.

The azimuth θβ is on a plane that extends from the β-axis in a direction perpendicular to the antenna board 20 and is expressed in terms of an angle from the β-axis. The DBF signals of the rows α1 to α7 for the azimuth Θα herein correspond to the respective synthesized signals (i.e., the synthesized signals obtained by beamforming the azimuth Θα) in which the extracted signals are synthesized so as to emphasize the incoming wave component from the azimuth Θα by the DBF processes for the rows α1 to α7 performed at step S210.

As another example, at step S230, the azimuth detecting unit 55 can perform a DBF process in the β-axis direction described hereafter. That is, at step S230, the azimuth detecting unit 55 performs a DBF process for the β-axis direction using the DBF signals of the rows α3, α2, and α1 corresponding to the group of reception points P(R12), P(R21), and P(R31) in a row β1, for each azimuth Θα, as the DBF process for the row β1. Specifically, the azimuth detecting unit 55 generates a synthesized signal for each azimuth θβ to be processed. The synthesized signal is obtained by synthesizing the DBF signals of the rows α3, α2, and α1 for the azimuth Θα, so that the incoming wave component from the azimuth θβ to be processed is emphasized. Based on the synthesized signal, the azimuth detecting unit 55 then determines the reception power of the incoming wave from the azimuth θβ to be processed, and detects the azimuth spectrum for the azimuth θβ.

Similarly, at step S230, the azimuth detecting unit 55 performs the DBF process for the β-axis direction using the DBF signals of the rows α4, α3, α2, and α1 corresponding to the group of reception points P(R13), P(R22), P(R32), and P(R41) in a row β2, for each azimuth Θα, as the DBF process related to the row β2, and detects the azimuth spectrum. Similarly, at step S230, the azimuth detecting unit 55 performs the DBF processes for rows β3 to β6 for each azimuth Θα, and detects the azimuth spectrums. The DBF signals used in the DBF processes for the rows β3 to β6 correspond to the rows in the a-axis direction to which the corresponding reception points belong.

Subsequently, the azimuth detecting unit 55 detects the incoming azimuth of reflected waves, i.e., the azimuth (Θx,Θy) of each target, from the group of azimuth spectrums (step S240). Specifically, the azimuth detecting unit 55 converts the group of azimuth spectrums to azimuth spectrums in a three-dimensional space in which the reception powers are plotted on an axis perpendicular to a (θx,θy) plane. In the converted azimuth spectrum, the azimuth detecting unit 55 detects each azimuth (θx,θy) indicating a peak of not less than the threshold, thereby detecting the azimuth (Θx,Θy) of each target.

Subsequently, the azimuth detecting unit 55 inputs each detected azimuth (Θx,Θy) to the output unit 57 (step S250) and terminates the azimuth detection process.

The second embodiment is configured as described above. According to the present embodiment also, highly accurate target detection can be achieved with a small number of reception antenna elements. As another example, at steps S210 to S240, for each of the rows α1 to α7 and the rows β1 to β6, the DBF process can be performed using the extracted signals of the corresponding reception points. The azimuth (Θx,Θy) of a target can be detected from the group of azimuth spectrums obtained through these DBF processes, or from the group of detected azimuths Θα and Θβ.

Third Embodiment

A radar apparatus 10 of a third embodiment will be described. The radar apparatus 10 of the third embodiment differs from the first embodiment only in the azimuth detection process performed by the azimuth detecting unit 55. Therefore, the azimuth detection process performed by the azimuth detecting unit 55 will be selectively described hereafter.

Figure 12:
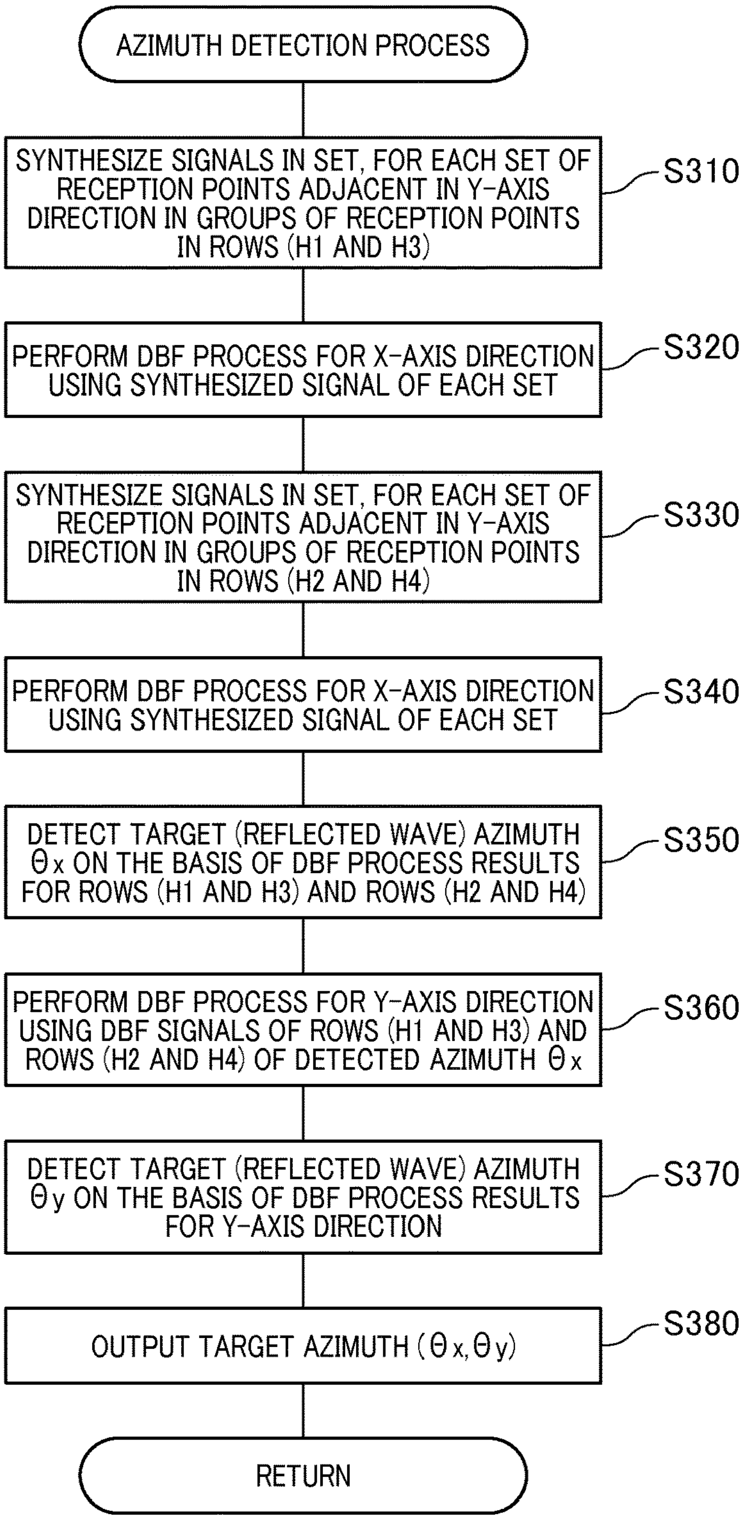
FIG. 12 is a flowchart illustrating an azimuth detection process of a radar apparatus related to a third embodiment.
Figure 13:
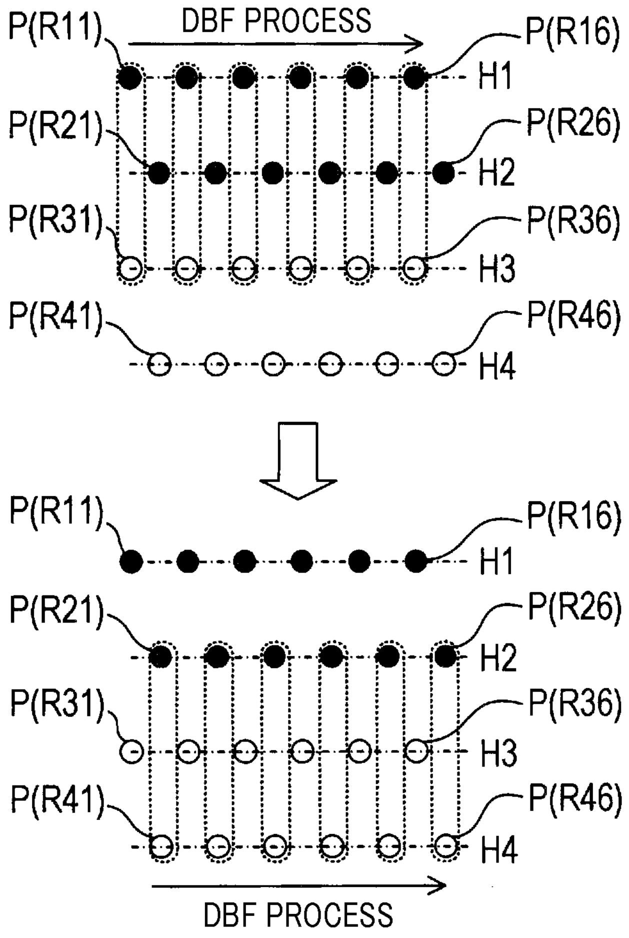
FIG. 13 is a diagram illustrating groups of reception points subjected to a DBF process in the radar apparatus related to the third embodiment.

In the present embodiment, the azimuth detecting unit 55 repeatedly performs the azimuth detection process shown in FIG. 12. Once the azimuth detection process is started, for the group of reception points P(R11) to P(R16) in the rows H1 and the group of reception points P(R31) to P(R36) in the row H3, the azimuth detecting unit 55 generates a synthesized signal for each set of reception points adjacent in the Y-axis direction. Each set of reception points is encircled by the broken line in the upper portion of FIG. 13 (step S310).

The synthesized signal is generated by synthesizing the two extracted signals corresponding to the set. The correspondence between the reception points and the extracted signals shown in FIG. 3 is as described in the second embodiment.

The azimuth detecting unit 55 performs the DBF process in the X-axis direction using the synthesized signal of each set generated at step S310 and detects the azimuth spectrum for the azimuth θx (step S320). Further, for the group of reception points P(R21) to P(R26) in the row H2 and the group of reception points P(R41) to P(R46) in the row H4, the azimuth detecting unit 55 generates a synthesized signal for each set of reception points adjacent in the Y-axis direction. Each set of reception points is enclosed by the broken line in the lower portion of FIG. 13 (step S330). The synthesized signal is generated by synthesizing the two extracted signals corresponding to the set.

The azimuth detecting unit 55 then performs the DBF process in the X-axis direction using the synthesized signal of each set generated at step S330 and detects the azimuth spectrum for the azimuth θx (step S340).

After completing the processes at steps S310 to S340, the azimuth detecting unit 55 detects each azimuth θx as the azimuth Θx of the target (incoming azimuth of the reflected wave) (step S350). In this case, each azimuth θx indicates a peak with a reception power of not less than the threshold in the azimuth spectrums detected at steps S320 and S340.

Herein, the azimuth detecting unit 55 can detect the azimuth Θx of each target based on overlapping of the azimuth spectrums detected at steps S320 and S340. At step S350, the azimuth detecting unit 55 can also detect the azimuth Θx of each target using the technique described as another example for step S150.

Subsequently, the azimuth detecting unit 55 performs the DBF process in the Y-axis direction for each of the detected azimuths Θx described above (step S360), followed by detecting the azimuth Θy of the corresponding target (step S370). In the DBF process for each azimuth Θx at step S360, the azimuth detecting unit 55 acquires a first DBF signal and a second DBF signal for the azimuth Θx. The first DBF signal for the azimuth Θx corresponds to the synthesized signal generated so as to emphasize the incoming component from the azimuth Θx through the DBF process performed at step S320. The second DBF signal for the azimuth Θx corresponds to the synthesized signal generated so as to emphasize the incoming component from the azimuth Θx through the DBF process performed at step S340.

The azimuth detecting unit 55 then performs the DBF process in the Y-axis direction using the acquired first DBF and second DBF signals for the azimuth Θx, thereby detecting the azimuth spectrum for the azimuth θy.

At step S370, for each azimuth Θx, the azimuth detecting unit 55 detects each azimuth θy as the azimuth θy of the target. In this case, each azimuth θy shows a peak with a reception power of not less than the threshold in the azimuth spectrum detected at step S360 indicates.

The azimuth detecting unit 55 inputs the azimuth (Θx,Θy) of each target, which has been detected as described above, to the output unit 57 (step S380), and then terminates the azimuth detection process.

The radar apparatus 10 of the third embodiment is configured as described above. In the present embodiment also, azimuth detection can be performed with higher accuracy compared to the case where only a single transmission antenna element is provided.

Fourth Embodiment

A radar apparatus 10 of a fourth embodiment will be described. In the radar apparatus 10 of the fourth embodiment, the configuration of a transmission antenna 121 differs from that of the transmission antenna 21 of the first embodiment. The difference in the transmission antenna 121 leads to the difference in processing the reception signals and detecting the azimuth (Θx,Θy) of a target, from the first embodiment. However, the process is conceptually the same as that of the first embodiment. Except for the transmission antenna 21, hardware configurations of the radar apparatus 10 of the present embodiment are also basically (conceptually) the same as those of the first embodiment. Therefore, the following description selectively deals with the configuration and reception signal processing which are characteristic of the present embodiment.

Figure 14:
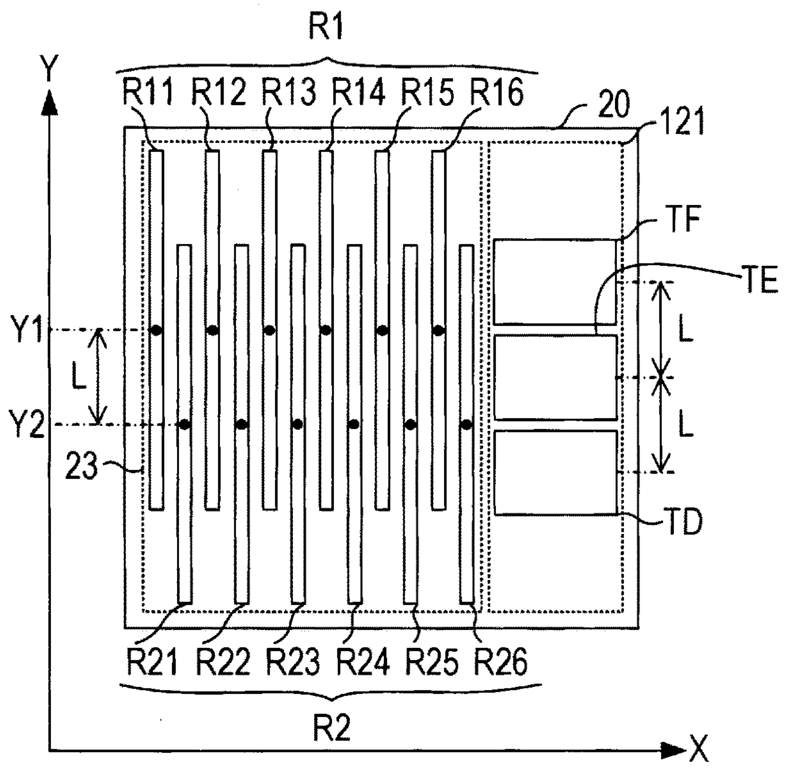
FIG. 14 is a diagram illustrating configurations of a transmission antenna and a reception antenna in a radar apparatus related to a fourth embodiment.

As shown in FIG. 14, the radar apparatus 10 of the present embodiment includes a transmission antenna 121 and the reception antenna 23 on the surface of the antenna board 20. The reception antenna 23 has the same configuration as that of the first embodiment.

The transmission antenna 121 is configured such that three transmission antenna elements TD, TE, and TF are arrayed in the Y-axis direction on the surface of the antenna board 20. The three transmission antenna elements TD, TE, and TF are arrayed such that adjacent transmission antenna elements are arranged at positions different from each other by a distance L in the Y-axis direction. In other words, the transmission antenna 121 is configured such that the three transmission antenna elements TD, TE, and TF are arranged at an interval equal to the arrangement interval L in the Y-axis direction of the groups R1 and R2 of reception antenna elements. In the present embodiment, the transmission signals Ss are time-divided and inputted to each of the transmission antenna elements TD, TE, and TF. The radar waves are repeatedly emitted from the transmission antenna elements TD, TE, and TF.

Figure 15:
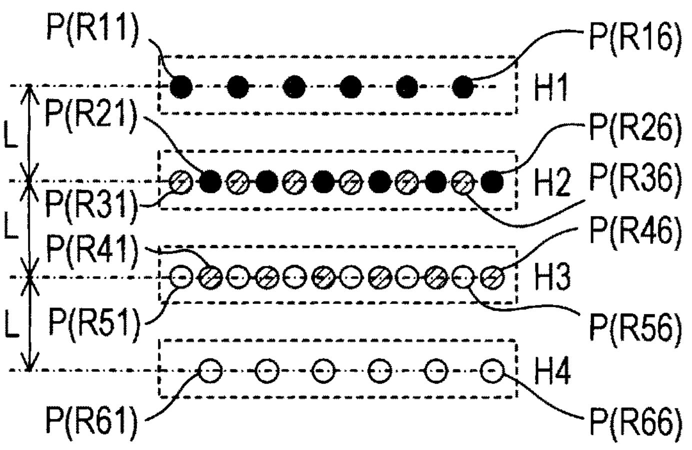
FIG. 15 is a diagram illustrating a geometrical arrangement of reception points in the radar apparatus related to the fourth embodiment.

In the radar apparatus 10, corrected reception points P(R11) to P(R16), P(R21) to P(R26), P(R31) to P(R36), P(R41) to P(R46), P(R51) to P(R56), and P(R61) to P(R66) are arrayed as shown in FIG. 15. These corrected reception points are obtained by correcting the reception points P(R11) to P(R16) and P(R21) to P(R26) of the reception antenna elements R11 to R16 and R21 to R26 serving as reception points for the radar waves emitted from the transmission antenna elements TD, TE, and TF. The correction is made assuming that the radar waves have been emitted from the reception antenna element TF. FIG. 16 shows the arrangement relationship of the corrected reception points in detail using a table.

According to the assumption mentioned above, the reception points P(R11) to P(R16) and P(R21) to P(R26) indicated by the black circles in FIG. 15 respectively correspond to reception points at which the reception antenna elements R11 to R16 and R21 to R26 receive the reflected waves of the radar waves emitted from the transmission antenna element TF.

In addition, the reception points P(R51) to P(R56) and P(R61) to P(R66) indicated by the white circles in FIG. 15 respectively correspond to reception points at which the reception antenna elements R11 to R16 and R21 to R26 receive the reflected waves of the radar waves emitted from the transmission antenna element TD.

Besides, the reception points P(R31) to P(R36) and P(R41) to P(R46) indicated by the hatched circles in FIG. 15 respectively correspond to reception points at which the reception antenna elements R11 to R16 and R21 to R26 receive the reflected waves of the radar waves emitted from the transmission antenna element TE.

In the present embodiment, in a geometrical arrangement of these virtual reception points P(R11) to P(R16), P(R21) to P(R26), P(R31) to P(R36), P(R41) to P(R46), P(R51) to P(R56), and P(R61) to P(R66), a group of reception points arranged in a row along the X-axis direction is taken as a group of reception points of a single array antenna. The DBF process in the X-axis direction is performed using the reception signals (specifically, the extraction signals from the analyzing unit 53) corresponding to the group of reception points.

In other words, in a manner similar to the first embodiment, the azimuth detecting unit 55 performs the azimuth detection process shown in FIG. 7 and performs the DBF process using the extracted signals corresponding to the group of reception points in the row H1 shown in FIG. 15 (step S110). As a result, the azimuth detecting unit 55 generates a synthesized signal (DBF signal) corresponding to each azimuth θx to be processed and detects the azimuth spectrum for the azimuth θx. The combinations of reception points belonging to each of the rows H1 to H4 are shown in the lateral rows in FIG. 16.

Similarly, for each of the rows H2, H3, and H4 shown in FIG. 15, the azimuth detecting unit 55 performs the DBF process using the extracted signals corresponding to the group of reception points of the row (steps S120, S130, and S140).

Subsequently, the azimuth detecting unit 55 detects each azimuth θx as the azimuth Θx of a target (incoming azimuth of a reflected wave) (step S150). In this case, each azimuth θx indicates a peak with a reception power of not less than the threshold in the azimuth spectrums.

Further, in a manner similar to first embodiment, the azimuth detecting unit 55 detects the azimuth Θy of each target using the DBF signals for the azimuth Θx of each of the rows H1 to H4, for each detected azimuth Θx (step S160 and step S170), and inputs the azimuth (Θx,Θy) of each target to the output unit 57 (step S180).

The fourth embodiment is configured described above. According to the present embodiment also, similar to the first embodiment, highly accurate target detection can be achieved with a small number of reception antenna elements. In particular, according to the present embodiment, erroneous detection of an azimuth attributed to a grating lobe can be minimized because the interval between the reception points in the rows H2 and H3 is short. Therefore, highly accurate azimuth detection can be performed.

Fifth Embodiment

A radar apparatus 10 of a fifth embodiment will be described. The hardware configuration of the radar apparatus 10 of the fifth embodiment is the same as that of the fourth embodiment. The only difference of the radar apparatus 10 of the present embodiment from the fourth embodiment lies in the azimuth detection process performed by the azimuth detecting unit 55. Therefore, following description selectively sets forth the azimuth detection process performed by the azimuth detecting unit 55 of the fifth embodiment.

Figure 17:
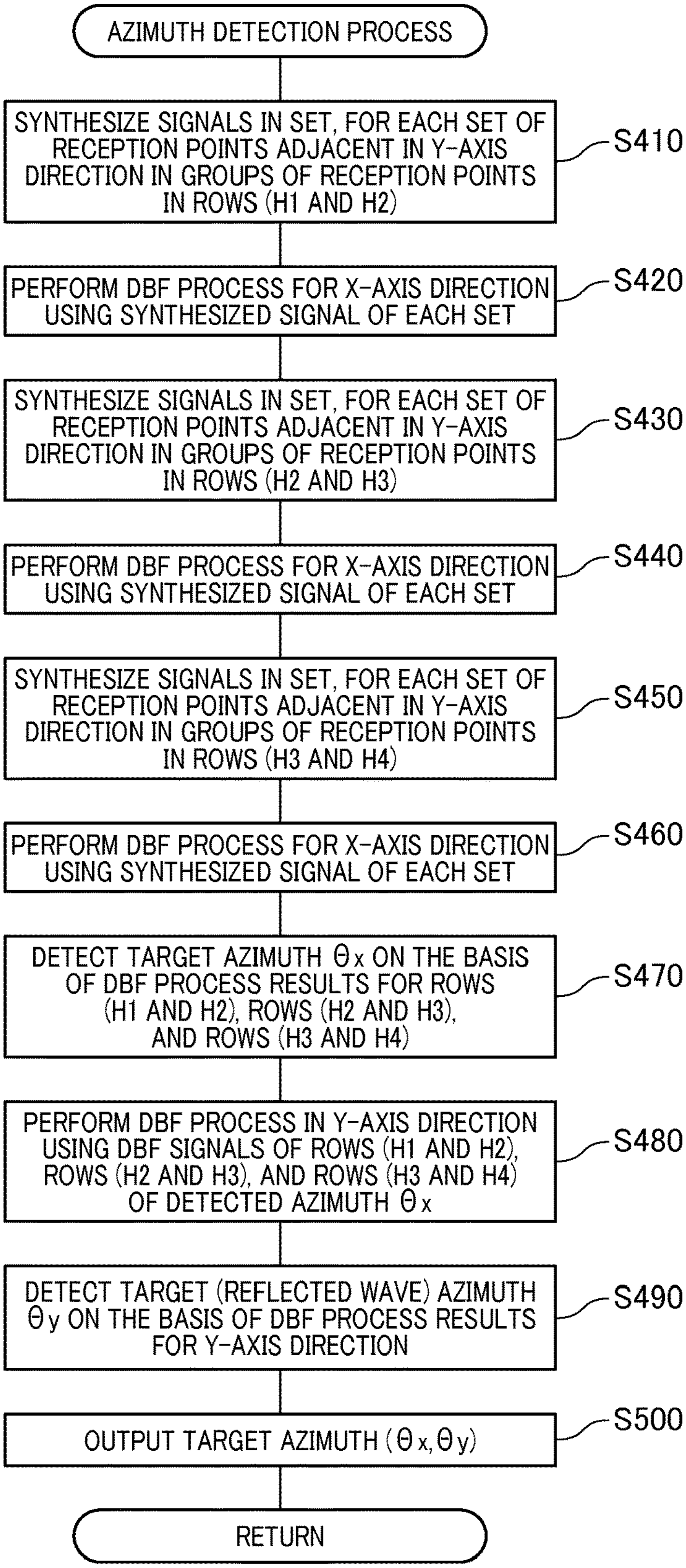
FIG. 17 is a flowchart illustrating an azimuth detection process of a radar apparatus related to a fifth embodiment.

In the present embodiment, an azimuth detection process shown in FIG. 17 based on the same concept as that of the third embodiment is performed. Once the azimuth detection process is started, the azimuth detecting unit 55 generates, first, a synthesized signal for each set of reception points that are adjacent in the Y-axis direction in the group of reception points in the row H1 and the group of reception points in the row H2 (each set encircled by the broken line in the upper portion of FIG. 18) (step S410). The synthesized signal is generated by synthesizing the two extracted signals corresponding to the set. The azimuth detecting unit 55 then performs the DBF process in the X-axis direction using the synthesized signal of each set and detects the azimuth spectrum for the azimuth θx (step S420).

Figure 18:
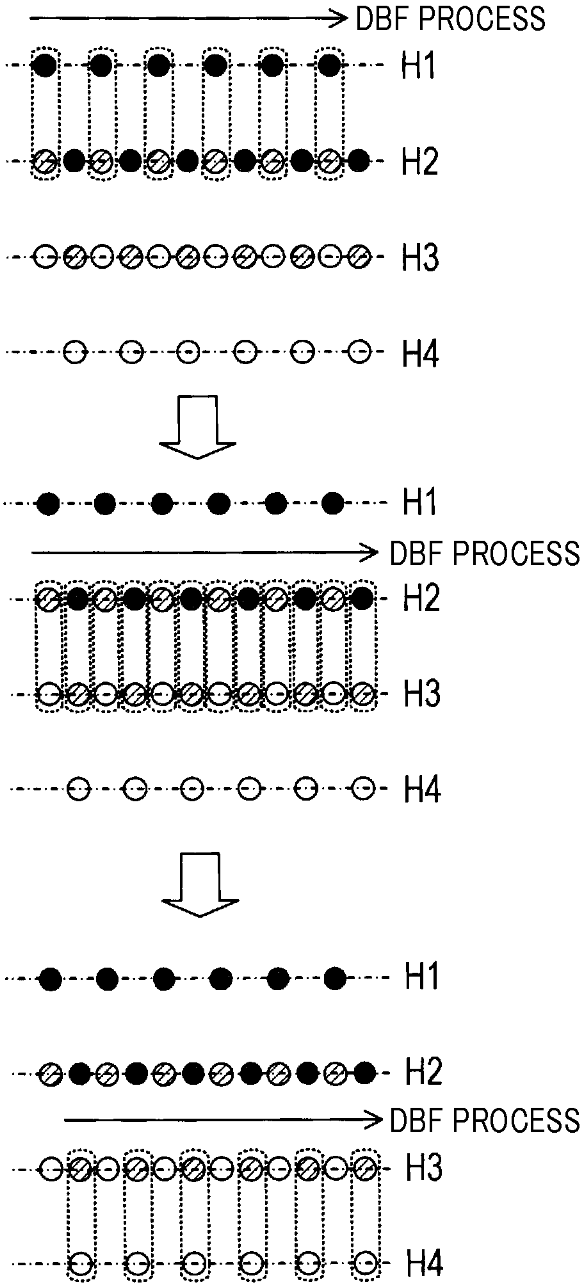
FIG. 18 is a diagram illustrating groups of reception points subjected to a DBF process in the radar apparatus related to the fifth embodiment.

For the group of reception points in the row H2 and the group of reception points in the row H3, the azimuth detecting unit 55 generates a synthesized signal for each set of reception points that are adjacent in the Y-axis direction (each set encircled by the broken line in the middle portion of FIG. 18) (step S430). The synthesized signal is generated by synthesizing the two extracted signals corresponding to the set. The azimuth detecting unit 55 then performs the DBF process in the X-axis direction using the synthesized signal of each set and detects the azimuth spectrum for the azimuth θx (step S440).

For the group of reception points in the row H3 and the group of reception points in the row H4, the azimuth detecting unit 55 generates a synthesized signal for each set of reception points that are adjacent in the Y-axis direction (each set encircled by the broken line in the lower portion of FIG. 18) (step S450). The synthesized signal is generated by synthesizing the two extracted signals corresponding to the set. The azimuth detecting unit 55 then performs the DBF process in the X-axis direction using the synthesized signal of each set and detects the azimuth spectrum for the azimuth θx (step S460).

The azimuth detecting unit 55 detects each azimuth θx as the azimuth Θx of the target (incoming azimuth of the reflected wave) (step S470). In this case, each azimuth θx indicates a peak with a reception power of not less than the threshold in the azimuth spectrums detected as described above.

Subsequently, the azimuth detecting unit 55 performs the DBF process in the Y-axis direction for each of the detected azimuths Θx described above (step S480), and then detects the azimuth Θy of the corresponding target (step S490). In the DBF process for each azimuth Θx, the azimuth detecting unit 55 acquires first, second, and third DBF signals for the azimuth Θx. The first, second, and third DBF signals for the azimuth Θx herein respectively correspond to the synthesized signals generated so as to emphasize the incoming wave component from the azimuth Θx through the DBF processes performed at steps S420, S440 and S460.

The azimuth detecting unit 55 then performs the DBF process in the Y-axis direction using the acquired first, second, and third DBF signals for the azimuth Θx, thereby detecting the azimuth spectrum for the azimuth θy. The azimuth detecting unit 55 detects the azimuth Θy of each target (incoming azimuth of each reflected wave) using the azimuth spectrums detected as described above (step S490).

The azimuth detecting unit 55 inputs the azimuth (Θx,Θy) of each target detected, as described above, to the output unit 57 (step S500), and then terminates the azimuth detecting process.

The fifth embodiment is configured as described above. In the present embodiment also, highly accurate target detection can be achieved with a small number of reception antenna elements.

Other Embodiments

The present invention should not be construed as being limited to the above-described embodiments, but can be variously modified.

For example, the first to third embodiments describe a radar apparatus having the transmission antenna 21 that includes two transmission antenna elements TA and TB. However, the configuration should not be limited to this. The transmission antenna 21 may be configured to include three or more transmission antenna elements in which adjacent transmission antenna elements are arranged at the interval 2L corresponding to twice the arrangement interval L in the Y-axis direction of the groups of reception antenna elements.

Further, in the first to third embodiments, the reception antenna 23 can be configured to include three or more rows of groups of reception antenna elements. When the reception antenna 23 including three or more rows of groups of reception antenna elements is provided, the groups of reception antenna elements can be arranged so that the reception antenna elements in each row are sequentially arrayed at even intervals one by one in the X-axis direction. The groups of reception antenna elements can be arrayed at an even interval equal to the arrangement interval L in the Y-axis direction.

In this example, when M rows of groups of reception antenna elements are provided, the transmission antenna elements can be arrayed in the Y-axis direction so that the arrangement interval between adjacent transmission antenna elements equals to a distance M×L.

The fourth and fifth embodiments describe the radar apparatus 10 having the transmission antenna 21 that includes three transmission antenna elements TD, TE, and TF. However, the configuration should not be limited to this. The transmission antenna 21 can be configured to include two, or four or more, transmission antenna elements in which adjacent transmission antenna elements are arranged at an interval equal to the arrangement interval of the groups of reception antenna elements. This way of arraying the transmission antenna elements can achieve the azimuth detection capability equivalent to that of the case where reception antenna elements are densely arranged in the X-axis direction.

In the above embodiments, the reception antenna elements R11 to R16 and R21 to R26 are arrayed in the X-axis direction (horizontal direction), while the transmission antenna elements TA, TB, TD, TE, and TF are arrayed in the Y-axis direction (vertical direction). However, the configuration should not be limited to this. Depending on usage, it may be so configured that the reception antenna elements R11 to R16 and R21 to R26 are arrayed in the Y-axis direction (vertical direction), while the transmission antenna elements TA, TB, TD, TE, and TF are arrayed in the X-axis direction (horizontal direction).

The transmission antenna 21 includes a group of transmission antenna elements arrayed in the Y-axis direction. A plurality of such arrays in the Y-axis direction may be provided in the X-axis direction. With the transmission antenna 21 configured in this way, azimuth detection capability in the X-axis direction can also be enhanced.

Further, to increase azimuth detection accuracy of the azimuth θx, the radar apparatus 10 may be configured as follows. That is, the reception signals may be processed so as to eliminate the effects of the shifting in the Y-axis direction by an amount L, between the reception antenna elements R11 to R16 and the reception antenna elements R21 to R26. The DBF process may then be performed, taking the group of reception antenna elements R11 to R16 and R21 to R26 as a single array antenna, followed by detecting the azimuth Θx of a target. More specifically, the present invention can be applied not only to the in-vehicle radar apparatuses and FMCW radar apparatuses, but also to various radar apparatuses.

Besides the beamformer method, high-resolution azimuth detection techniques in general may be applied to the digital beamforming process, including the Capon method, the MUSIC (multiple signal classification) method, the ESPRIT (estimation of signal parameters via rotation invariance technique) method, and the like.

A radar apparatus can provide the same functions when the transmission antenna and the reception antenna are interchanged. Therefore, the radar apparatus 10 may be configured by interchanging the transmission antenna 21 or 121 and the reception antenna 23.

[Correspondence]

The function achieved by the transmission circuit 11 and the switching distribution circuit 13 in the above embodiments corresponds to an example of the function achieved by the transmission control means. The function achieved by the signal processing unit 50 corresponds to an example of the function achieved by the azimuth detecting means.

REFERENCE SIGNS LIST

1: vehicle
10: radar apparatus
11: transmission circuit
13: switching distribution circuit
20: antenna board
21, 121: transmission antenna
23: reception antenna
30: mixer
40: analog-to-digital converter
50: signal processing unit
51: sorting unit
53: analyzing unit
55: azimuth detecting unit
57: output unit
R11 to R16, R21 to R26: reception antenna element
R1, R2: reception antenna element group
TA, TB, TD, TE, TF: transmission antenna element

The invention claimed is:

1. A radar apparatus comprising:

a first antenna; and a second antenna, the first antenna including, as antenna elements configuring the first antenna, a plurality of first antenna elements that are arrayed in a first direction on a surface oriented in a forward direction;

the second antenna including, as antenna elements configuring the second antenna, a plurality of second antenna elements that are arrayed in a second direction perpendicular to the first direction on a surface oriented in a forward direction, the radar apparatus emitting radar waves using either of the first antenna and the second antenna, and receiving reflected waves of the radar waves using the other of the first antenna and the second antenna, wherein:

the first antenna includes a plurality of rows of first antenna element groups in the second direction, as the plurality of first antenna elements that are arrayed in the first direction;

the first antenna is configured to include two rows of the first antenna element groups as the plurality of rows of the first antenna element groups, the plurality of first antenna elements configuring the two rows of first antenna element groups being alternately arrayed in rows in the first direction to configure a zigzag array along two directions slanted relative to the first direction, the two rows of the first antenna element groups being arranged at positions differing from each other by a predetermined distance in the second direction;

the second antenna is configured such that the plurality of second antenna elements adjacent to each other are arranged at positions in the second direction, the positions differing from each other by a distance equal to twice the predetermined distance;

the first antenna as a reception antenna that receives the reflected waves; and the second antenna as a transmission antenna that transmits the radar waves, the apparatus further comprising:

a transmission control means for inputting transmission signals of the radar waves to the plurality of second antenna elements such that the radar waves are emitted from the plurality of second antenna elements at differing timings, and an azimuth detecting means for detecting an incoming azimuth of the reflected wave on the basis of a reception signal for each combination of the plurality of first antenna elements and the plurality of second antenna elements, with reception signals of each of the plurality of first antenna elements configuring the first antenna being sorted and defined for each of the plurality of second antenna elements that is a transmission source of the corresponding radar wave, and the azimuth detecting means:

detects an incoming azimuth relative to a first slanted direction of the reflected wave or an azimuth spectrum indicating a correspondence between the incoming azimuth and a reception power, on the basis of the reception signals of a corrected group of reception points arrayed along the first slanted direction that is indicated by the zigzag array, in a collection of the corrected reception points when reception points of the plurality of first antenna elements that receive the reflected waves of the radar waves emitted from the plurality of second antenna elements are corrected in conformity with the second direction so that, assuming that the radar waves are emitted from a specific single second antenna element among the plurality of second antenna elements, a path length from an emission point of the radar waves to each reception point, is equal to a path length when the assumption is not made;

detects an incoming azimuth relative to a second slanted direction of the reflected wave or an azimuth spectrum indicating a correspondence between the incoming azimuth and a reception power, on the basis of the reception signals of a group of corrected reception points arrayed along the second slanted direction that is indicated by the zigzag array; and detects incoming azimuths relative to the first and second directions of the reflected waves, as the incoming azimuths of the reflected waves, on the basis of the detected incoming azimuths relative to the first and second slanted directions of the reflected waves or the azimuth spectrums.

2. The radar apparatus according to claim 1, wherein:

the azimuth detecting means:

detects, for at least a single array among corrected groups of reception points arrayed along the first slanted direction, an incoming azimuth relative to the first slanted direction of the reflected waves or an azimuth spectrum by conducting a digital beamforming process of the reception signals of the group of corrected reception points configuring the array; and detects, for at least a single array among corrected groups of reception points arrayed along the second slanted direction an incoming azimuth relative to the second slanted direction of the reflected waves or an azimuth spectrum by conducting a digital beamforming process of the reception signals of the group of corrected reception points configuring the array.

3. The radar apparatus according to claim 1, wherein the first direction is a horizontal direction and the second direction is a vertical direction.

4. The radar apparatus according to claim 1, wherein:

the reception antenna and the transmission antenna are configured by a planar antenna mounted to a vehicle;

the planar antenna has an antenna board and a conductor pattern formed on a surface of the antenna board; and the plurality of first antenna elements and the plurality of second antenna elements are configured by the conductor pattern formed on the surface of the antenna board.

5. The radar apparatus according to claim 4, wherein:

the azimuth detecting means has a plurality of mixers that are electrically connected to the respective plurality of first antenna elements, an analog-to-digital converter that is connected to an output side of the plurality of mixers, and a signal processing unit that is connected to an output side of the analog-to-digital converter; and the transmission control means has a transmission circuit that is electrically connected to the plurality of second antenna elements and a distribution circuit that power-distributes transmission signals from the transmission circuit to the plurality of second antenna elements side and the plurality of mixers side.

6. The radar apparatus according to claim 1, wherein:

each of the plurality of first antenna elements configuring the plurality of rows of the first antenna element groups is configured to be elongated in the second direction, and the first antenna is configured such that the plurality of first antenna elements configuring the plurality of rows of the first antenna element groups are alternately arranged in rows in the first direction.

7. The radar apparatus according to claim 1, wherein the first antenna is configured such that the plurality of rows of the first antenna element groups, that are adjacent to each other, are arranged at positions in the second direction differing from each other by a distance shorter than the length of the plurality of first antenna elements in the second direction.

* * * * *